US012709181B2

(12) United States Patent
Zhang et al.

(10) Patent No.: US 12,709,181 B2
(45) Date of Patent: Aug. 18, 2026

(54) BATTERY SWAPPING DEVICE, BATTERY SWAPPING STATION AND BATTERY SWAPPING METHOD

(71) Applicants: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO. LTD., Shanghai (CN)

( * ) Notice: Subject to any disclaimer, the term of this patent is extended or adjusted under 35 U.S.C. 154(b) by 993 days.

(21) Appl. No.: 17/916,273

(22) PCT Filed: Apr. 6, 2021

(86) PCT No.: PCT/CN2021/085730
§ 371 (c)(1),
(2) Date: Mar. 31, 2023

(87) PCT Pub. No.: WO2021/197498
PCT Pub. Date: Oct. 7, 2021

(65) Prior Publication Data

US 2024/0034185 A1 Feb. 1, 2024

(30) Foreign Application Priority Data

Apr. 3, 2020 (CN) ......................... 202010262678.2
Apr. 3, 2020 (CN) ......................... 202010262696.0

(51) Int. Cl.
*H01M 10/44* (2006.01)
*B60L 53/16* (2019.01)
(Continued)

(52) U.S. Cl.
CPC ............... *B60L 53/80* (2019.02); *B60L 53/16* (2019.02); *B60L 53/30* (2019.02); *B60S 5/06* (2013.01)

(58) Field of Classification Search
CPC ......... H02J 7/0042; H02J 7/002; B60L 53/80; B60L 53/30; B60L 50/66
(Continued)

(56) References Cited

U.S. PATENT DOCUMENTS

2014/0003895 A1 1/2014 Moller
2021/0170895 A1* 6/2021 Austrheim ........... B65G 1/0464
2023/0226944 A1* 7/2023 Zhang .................. B65G 47/248
320/109

FOREIGN PATENT DOCUMENTS

CN 102602371 A 7/2012
CN 108583260 A 9/2018
(Continued)

OTHER PUBLICATIONS

Machine translation of CN108639024A (Oct. 12, 2018) (Year: 1018).*
(Continued)

*Primary Examiner* — Edward Tso

(57) ABSTRACT

Disclosed are a battery swapping device, a battery swapping station and a battery swapping method. The battery swapping device comprises a turnover mechanism for turning a used battery pack taken out of an electric vehicle from a first position to a second position in a first direction; or turning a fresh battery pack taken out of a battery charging bin from a third position to a fourth position in a second direction, the
(Continued)

first direction being opposite to the second direction. The present invention occupies less space for turnover, and can be significantly reduced with respect to a plane-rotating battery swapping device in structure. Thus, it can complete picking and placing of larger battery packs with a smaller space and structure. Therefore, battery swapping with a single large battery pack can be realized in a smaller area, thereby reducing the cost of the battery pack and facilitating promotion.

20 Claims, 13 Drawing Sheets

(51) Int. Cl.

| | |
|---|---|
| ***B60L 53/30*** | (2019.01) |
| ***B60L 53/80*** | (2019.01) |
| ***H01M 10/46*** | (2006.01) |
| *B60S 5/06* | (2019.01) |

(58) Field of Classification Search

USPC ........ 320/107, 109, 114, 115; 414/281, 282, 414/283, 286

See application file for complete search history.

(56) References Cited

FOREIGN PATENT DOCUMENTS

| | | | |
|---|---|---|---|
| CN | 108583539 | A | 9/2018 |
| CN | 108639024 | A | 10/2018 |
| CN | 108674389 | A | 10/2018 |
| CN | 209582888 | U | 11/2019 |
| CN | 110525251 | A | 12/2019 |
| JP | 2016146268 | A | 8/2016 |
| WO | 2012105528 | A1 | 8/2012 |

OTHER PUBLICATIONS

Aug. 12, 2025 the First Office Action issued in Korean Patent Application No. 10-2022-7038530.

Jun. 28, 2021 International Search Report issued in International Patent Application No. PCT/CN2021/085730.

Jun. 28, 2021 Written Opinion of the International Searching Authority issued in International Patent Application No. PCT/CN2021/085730.

Jul. 11, 2022 International Preliminary Report on Patentability issued in International Patent Application No. PCT/CN2021/085730.

Mar. 25, 2025 the First Office Action issued in Japanese Patent Application No. 2022-559898.

* cited by examiner

BATTERY SWAPPING DEVICE, BATTERY SWAPPING STATION AND BATTERY SWAPPING METHOD

The present application is a National Stage of International Application No. PCT/CN2021/085730, filed on Apr. 6, 2021, which claims the priority of Chinese patent application CN2020102626782 and CN2020102626960 filed at Apr. 3, 2020. The contents of the Chinese patent application are incorporated herein by reference in their entireties.

TECHNICAL FIELD

The invention relates to a battery swapping device, a battery swapping station and a battery swapping method.

BACKGROUND

At present, in the field of battery swapping for electric vehicle, it mainly includes two types as chassis battery swapping and side battery swapping, wherein side battery swapping is implemented by steps including, a battery swapping device takes out a battery pack from an electrical vehicle, and plane-rotates 1800 on the battery swapping device, so as to change the orientation of the charging port of the battery pack from the electrical vehicle to a battery charging bin, and then plug the battery pack into the battery charging bin at the other side of the battery swapping device for charging. Due to the constraints caused by the structure of vehicle itself, today it usually uses the way as dual side battery swapping. The dual side battery swapping just needs a battery swapping device to rotate battery pack at 1800 on the battery swapping device, then plug the battery pack into a battery charging bin for charging.

However, because it needs to plane-rotate the battery pack, it requires a very large space when rotating a long-strip battery pack, thereby it makes the structure of a battery swapping device complicated and the volume large, which not only directly affects the manufacturing difficulty of a battery swapping device, but also increases the occupied area of a battery swapping station, thus electric vehicle can only take the battery swapping way via a plurality of small battery packs, however, the way via a plurality of battery packs has a high requirement on the cost of battery pack of a vehicle, and has a greater contradiction to market acceptance, which is not good for promoting mass production.

CONTENT OF THE PRESENT INVENTION

The technical problem to be solved by the present invention is to overcome the disadvantages that the structure of the battery swapping device in the prior art is complicated, which cause great manufacturing difficulty and battery swapping station occupying large area, then provide a battery swapping device, a battery swapping station and a battery swapping method.

The present invention solves the above-mentioned technical problems by the following technical solutions:

A battery swapping device for transferring battery packs between an electric vehicle and a battery charging bin, characterized in that the battery swapping device comprises a turnover mechanism, and the turnover mechanism is used for turning a used battery pack taken out of an electric vehicle from a first position to a second position in a first direction; or the battery swapping device is used for turning a fresh battery pack taken out of a battery charging bin from a third position to a fourth position in a second direction, the first direction is opposite to the second direction.

Wherein, the first position and the fourth position can be same position, and the second position and the third position can be same position. Thus the turnover of the turnover mechanism is implemented mainly between the two positions.

The turnover mechanism in the present invention rotates battery pack by a turning way. It needs less space for the turnover of the battery pack itself, and the turnover mechanism can be significantly reduced with respect to a plane-rotating battery swapping device in structure. Thus, the battery swapping device of the present invention can complete picking and placing of larger battery packs in a charging station with a smaller space and structure. Therefore, battery swapping of an electric vehicle with a single large battery pack can be realized in a smaller area of the battery swapping station, thereby reducing the cost of the battery pack and facilitating promotion.

Preferably, the turnover mechanism comprises a first turnover part and a second turnover part, and the first turnover part is used for carrying the battery pack located at the first position or the fourth position, and the second turnover part is used for carrying the battery pack located at the second position or the third position, the first turnover part and the second turnover part turn coaxially.

The first turnover part and the second turnover part respectively realize the carrying of battery pack at different positions, which are corresponding to the picking and placing of battery pack respectively at the electric vehicle side and the charging bin side. Wherein, the first turnover part is matched with the electric vehicle when facing the first position and the fourth position to realize the picking and placing of battery pack, and the second turnover part is matched with the battery charging bin when facing the second position and the third position to realize the picking and placing of the battery pack.

Preferably, the battery pack has a first side and a second side which are perpendicular to each other, when the battery pack is located at the first position or the fourth position, the first side is carried on the first turnover part, and the second side is abutted on the second turnover part; when the battery pack is located at the second position or the third position, the second side is carried on the second turnover part, and the first side is abutted on the first turnover part.

The first turnover part and the second turnover part are matched with each other to realize the roles of limiting position and abutting for the two sides of the battery pack. Thus, when the battery pack is turned over, it can avoid the shaking of the battery pack and ensure stable turnover of the battery pack.

Preferably, the first turnover part and the second turnover part are arranged to be perpendicular to each other. The first turnover part and the second turnover part which are arranged to be perpendicular to each other need only 90-degree turnover, then they can realize the rotation of the battery pack.

Wherein, the charging ports of battery packs at the first position and the fourth position are oriented horizontally to facilitate matching with electric vehicles, and the battery packs at the second position and the third position are oriented vertically to facilitate matching with charging equipment.

Preferably, the first turnover part and the second turnover part are driven by a same turnover driving device, or the first turnover part and the second turnover part are driven by different turnover driving devices.

By the same turnover driving device, it can simultaneously drive the movement of the first turnover part and the second turnover part, while by different turnover driving devices, they can control the movement of the first turnover part and the second turnover part respectively.

Preferably, the turnover driving device comprises a telescopic rod, and the telescopic rod is connected with the first turnover part and/or the second turnover part, and drives the first turnover part and the second turnover part to rotate.

The telescopic rod generates the movement of the first turnover part and/or the second turnover part by expanding and contracting in its own length direction. The telescopic rod can be a pneumatic or hydraulic mechanism. The connection structure of the telescopic rod is simple and it can be converted into rotation by a simple linear movement.

Preferably, the turnover mechanism comprises a base, and the first turnover part and the second turnover part are rotatably arranged relative to the base, wherein one end of the telescopic rod is rotatably connected with the bottom of the first turnover part and/or the second turnover part, while the other end of the telescopic rod is rotatably connected with the base.

The movement in the length direction of the telescopic rod itself, as well as the rotations at both ends can realize the synthesis of the motion, which can avoid jam during action, and smoothly realize the turnover of the first turnover part and/or the second turnover part.

Preferably, the turnover driving device comprises a turnover motor and a gear set, the turnover motor drives the gear set to rotate, and the gear set is connected with the first turnover part and/or the second turnover part and drives the first turnover part and/or the second turnover part to rotate. The turnover motor drives the gear set to rotate by its own rotation, so that the first turnover part and/or the second turnover part rotate following with it. The turnover motor can ensure that the first turnover part and/or the second turnover part are turned to an accurate position by controlling its own rotation amount.

Preferably, the turnover driving device comprises a turnover motor and a gear set, wherein the gear set at least comprises an input gear and an output gear, and the input gear and the output gear are gear connected with each other, wherein the turnover motor directly or indirectly drives the input gear to rotate, and the first turnover part and the second turnover part are fixedly connected with the output gear by means of a turning shaft, and rotate following with the output gear. The input gear and the output gear can directly generate output just between themselves or transfer by other gears.

Preferably, the first turnover part and the second turnover part are both connected with a rotational plate, and the turnover driving device is connected with the rotational plate and drives the turntable to rotate. The rotational plate is used as a shared part of the first turnover part and the second turnover part, so just driving the rotational plate, it can simultaneously drive the first turnover part and the second turnover part. Meanwhile the rotational plate can also be used for carrying the battery pack.

Preferably, an extension mechanism is arranged on the first turnover part and/or the second turnover part for taking out the battery packs located at electric vehicle or battery charging bin, or placing the battery packs on electric vehicle or battery charging bin. The extension mechanism realizes matching with the electric vehicle and the battery charging bin respectively, thereby facilitating the transportation for battery pack. The extension mechanism can realize the transmission function for battery pack by its own movement, then realize the movement of battery pack between the first turnover part and the second turnover part.

Preferably, the first turnover part comprises a first extension mechanism, and the second turnover part comprises a second extension mechanism, wherein the first extension mechanism picks and places battery pack at the first position or the fourth position, and the second extension mechanism picks and places battery pack at the second position or the third position. Wherein, the first extension mechanism is matched with the electric vehicle to realize picking and placing of battery pack. The second extension mechanism is matched with the battery charging bin to realize picking and placing of battery pack.

Preferably, the extension direction of the first extension mechanism and the extension direction of the second extension mechanism are intersected, so that battery pack is relayed between the first extension mechanism and the second extension mechanism. After the battery pack is transported to the end on the first extension mechanism, it naturally contacts the second extension mechanism. And after it is turned over, the second extension mechanism straightly carries the battery pack for transportation. On the contrary, after the battery pack is transported to the end on the second extension mechanism, it naturally contacts the first extension mechanism. And after it is turned over, the first extension mechanism straightly carries the battery pack for transportation.

Preferably, both the first extension mechanism and the second extension mechanism are telescopic forks. The telescopic fork can be any existing equipment that can realize expanding and contracting in its length direction.

Preferably, the battery swapping device further comprises a first transmission motor and a second transmission motor, wherein the first transmission motor directly or indirectly drives the first extension mechanism, and the second transmission motor directly or indirectly drives the second extension mechanism.

Preferably, the battery swapping device further comprises a limit sensor, the limit sensor is used for detecting the extension distance of the first extension mechanism and the second extension mechanism, and adjusting the extension distance of the first extension mechanism and the second extension mechanism respectively by the first transmission motor and the second transmission motor.

Preferably, the battery swapping device further comprises a turnover-in-position sensor, the turnover-in-position sensor is used for detecting the turning angle of the first turnover part and the second turnover part, and adjusting the turning angle of the first turnover part and the second turnover part by the turnover motor.

Preferably, the turnover mechanism comprises a base, the first turnover part and the second turnover part are rotatably connected with the base, and the turnover driving device drives the first turnover part and the second turnover part to rotate.

Preferably, the battery swapping device comprises an outer frame and a lifting mechanism, and the base is connected with the outer frame by means of the lifting mechanism, and moved up and down relative to the outer frame. By means of the lifting mechanism, it can realize the position adjustment of the battery pack in the height direction, so as to the battery pack can be corresponding to the battery charging bins with different height.

Preferably, the lifting mechanism is connected with the outer frame by a chain transmission mechanism, and the lifting mechanism and the outer frame are guided by guide wheels between themselves.

The chain transmission mechanism plays a role in lifting the turnover mechanism, and the guide wheel plays a role in smoothly guiding.

A battery swapping station, characterized in that, the battery swapping station comprises: a vehicle carrying platform for an electric vehicle parking to swap battery pack; a charging equipment with a plurality of charging bins for storing battery packs, the charging bin is equipped with an electrical connector for electric connection with the battery pack located in the charging bin for charging; the battery swapping device is used for picking, placing and transferring the battery between electric vehicle and battery charging bins, and the turnover mechanism is used for vertically turning the battery pack taken out of battery charging bins or electric vehicle.

A battery swapping method, characterized in that, the battery swapping method is implemented by the battery swapping device, which comprises: taking out a used battery pack from an electric vehicle and place it at a first position; turning the used battery pack taken out from the first position to the second position in the first direction; placing the used battery pack at the second position into battery charging bins for charging, and/or taking the fresh battery pack out of battery charging bins and placing it at the third position; turning the fresh battery pack taken out from the third position to the fourth position in the second direction; and placing the fresh battery pack at the fourth position into the electric vehicle.

A battery swapping device, the battery swapping device comprises:

A turnover mechanism, and the turnover mechanism is used for turning a used battery pack taken out of an electric vehicle from a first position to a second position in a first direction; or the battery swapping device is used for turning a fresh battery pack taken out of a battery charging bin from a third position to a fourth position in a second direction, the first direction is opposite to the second direction.

A push-pull mechanism, the push-pull mechanism is connected with the turnover mechanism, and the push-pull mechanism is arranged to move back and forth relative to the turnover mechanism, when the turnover mechanism is located at the first position, the push-pull mechanism is used for pulling out the used battery pack from an electric vehicle; when the turnover mechanism is located at the fourth position, the push-pull mechanism is used for pushing the fresh battery pack into electric vehicle.

Wherein, the first position and the fourth position can be same position, and the second position and the third position can be same position. Thus, the turnover of the turnover mechanism is mainly implemented between two positions.

In this solution, during the battery pack being transferred between electric vehicle and battery charging bins, it takes the way that the turnover mechanism turns over the battery pack in the longitudinal space, which requires less space, so it overcomes the difficult technical problem that requires a large space if taking a horizontal rotation way, and moreover the turnover mechanism is simpler and workable in structure with respect to a battery swapping device by horizontally rotating. Meanwhile, it can reduce the cost of battery pack, and also can optimize the occupied area of battery swapping station, which facilitate promotion. In addition, by the reciprocating movement of the push-pull mechanism, it can quickly take out the used battery pack in vehicle and put it onto the turnover mechanism, or push the fresh battery pack on the turnover mechanism into electric vehicle.

Preferably, the turnover mechanism comprises a first turnover part and a second turnover part, the push-pull mechanism is connected with the first turnover part, and the push-pull mechanism is configured to move back and forth relative to the first turnover part.

In this solution, the first turnover part and the second turnover part are arranged in the turnover mechanism to realize carrying the battery pack at different positions, which correspond to picking and placing of the battery packs in electric vehicle and battery charging bin respectively, so as to facilitate the transfer of the battery pack. Specifically, when battery pack is at the first position and the fourth position, the first turnover part is matched with electric vehicle to realize picking and placing of battery pack, and when battery pack is at the second position and the third position, the second turnover part is matched with battery charging bin to realize picking and placing of battery pack. In addition, when battery pack is at the first and fourth positions, the push-pull mechanism can quickly take out battery pack from vehicle and push it into vehicle.

Preferably, the push-pull mechanism comprises a tray and a tray-pushing box, wherein the tray is connected with the first turnover part and rotates with the first turnover part, and the tray-pushing box is arranged on the tray and move back and forth relative to the tray so as to push or pull battery pack.

In this solution, after the tray synchronously moves forward with the first turnover part, the tray-pushing box moves forward further on the tray to the front end as so to fix battery pack, and then the tray-pushing box moves backwards along the tray to pull battery pack on the tray, at this moment, if the tray-pushing box moves forward again along the tray, then it can push battery pack out of the tray, Therefore, it can quickly realize pushing and pulling of battery pack by the reciprocating movement of the tray-pushing box relative to the tray, and the structure is simple and easy to implement.

Preferably, the tray-pushing box comprises an unlocking mechanism for matching with an unlocking component on the battery pack, so as to unlock the battery pack from the electric vehicle.

In order to prevent battery pack falling off, a locking mechanism is usually configured on electric vehicle to lock battery pack. In this solution, by arranging an unlocking mechanism on the tray-pushing box, it can synchronously realize battery pack being unlocked while the tray-pushing box is in contact with the battery pack for fixing, which improves the efficiency of picking and placing battery pack.

Preferably, the tray-pushing box also comprises a locking piece, the locking piece is used to match with the fixing piece arranged on the battery pack so that the tray-pushing box is connected with the battery pack to pull or push the battery pack.

In this solution, when the tray-pushing box moves forward to the front end of the tray, the fixed connection between the battery pack and the tray-pushing box is realized by the match of the locking piece and the fixing piece on the battery pack, which ensures that the battery pack can move synchronously with the tray-pushing box.

Preferably, the fixing piece is a magnetic piece, and the locking piece is configured to be able to adsorb with the magnetic piece so as to connect with the battery pack. In this solution, the tray-pushing box and the battery pack are connected fixedly by a magnetic adsorption, which is convenient for the fixed connection, meanwhile also can quickly and efficiently release the fixed connection as it can be realized only by releasing the magnetic adsorption force, which is convenient and quick.

Preferably, the locking piece is configured to be adsorption connection when the battery pack is located at the first position or the fourth position, and is configured to release the adsorption connection when the battery pack is at the second position or the third position.

In this solution, at the first position and the fourth position, the tray-pushing box moves forward so that the locking piece adsorb the fixing piece on the battery pack to realize the fixed connection between the tray-pushing box and the battery pack, which is convenient and quick; and at the second position and the third position, control the locking piece so that it can be separated from the battery pack just by releasing adsorption, thereby avoid interference with the second turnover part moving the battery pack.

Preferably, the push-pull mechanism further comprises a tray-guiding rail and a tray-driving device, wherein the tray-guiding rail is arranged on the tray, and the tray-pushing box is slidingly arranged on the tray-guiding rail, and the tray-driving device drives the tray-pushing box to slide back and forth;

In this solution, the tray-pushing box realizes the tray-pushing box sliding back and forth on the tray under the guidance of the tray-guiding rail, which improves the stability of the moving process of the tray-guiding rail, and ensures the safety and precision of the operation of pushing or pulling the battery pack.

Preferably, the tray-driving device comprises a tray-driving motor and a synchronous belt, one end of the synchronous belt is connected with the tray, the tray-driving motor matches with the synchronous belt, and drives the tray-pushing box to move relative to the tray by means of the synchronous belt.

In this solution, the moving distance and the moving position of the tray-pushing box can be precisely controlled by the synchronous belt, which improves the position accuracy of the tray-pushing box, and the structure is simple and the operation is convenient.

Preferably, a plurality of auxiliary rollers are also arranged on the tray, and the auxiliary rollers are arranged in a rolling way at the moving direction of the tray-pushing box, and contact in a rolling way with the bottom of the tray-pushing box. In this solution, by setting a plurality of auxiliary rollers, on the one hand, it can reduce the resistance during the synchronous reciprocating movement of the tray-pushing box with the battery pack, which facilitates moving and ensures the moving stability, on the other hand, it can play a certain supporting role for the battery pack.

Preferably, the first turnover part comprises a first extension mechanism, and the second turnover part comprises a second extension mechanism, and the push-pull mechanism is connected with the first extension mechanism, wherein the first extension mechanism picks and places the battery pack at the first position or the fourth position, and the second extension mechanism picks and places the battery pack at the second position or the third position, the reciprocating movement direction of the tray-pushing box is same as the expansion and contraction direction of the first extension mechanism.

In this solution, the first extension mechanism is matched with the electric vehicle to realize picking and placing of the battery pack. While the second extension mechanism is matched with the battery charging bin to realize picking and placing of the battery pack. In addition, at the first position or the fourth position, the first extension mechanism extends toward the electric vehicle and retracts so as to realize picking and placing the battery pack, during this process, the tray-pushing box move back and forth synchronously with the first extension mechanism to realize the fixed connection and separation of the battery pack, which improves the picking and placing efficiency of the battery pack.

Preferably, the position of the tray-pushing box when it is retracted and stopped does not exceed the position of the plane where the second extension mechanism is located, so as to ensure the battery pack can contact with the second extension mechanism.

In this solution, after the tray-pushing box is retracted, if the tray-pushing box exceeds the plane where the second extension mechanism is located, it will cause the battery pack cannot abut on the second extension mechanism, and then it causes the battery pack cannot be stably placed on the second extension mechanism after being turned over, which will cause the battery pack being turned and falling off, and damage the battery pack. The tray-pushing box adsorbs and fixedly connects with the battery pack, then retracts to drive the battery pack to move synchronously, by limiting the retracted position of the tray-pushing box, it can ensure the battery pack can be accurately moved and abutted on the second extension mechanism, and ensure the battery pack can fall on the second extension mechanism smoothly after being turned over.

Preferably, the first turnover part is used for carrying the battery pack located at the first position or the fourth position, and the second turnover part is used for carrying the battery pack located at the second position or the third position, the first turnover part and the second turnover part turn over coaxially.

Preferably, the battery pack has a first side and a second side which are perpendicular to each other, when the battery pack is located at the first position or the fourth position, the first side is supported on the first turnover part, and the second side is abutted on the second turnover part; when the battery pack is located at the second position or the third position, the second side is supported on the second turnover part, and the first side is abutted on the first turnover part. The first turnover part and the second turnover part are matched with each other to limit and abut the two sides of the battery pack. Thereby, when the battery pack is turned over, the shaking of the battery pack can be avoided and ensure the battery pack being turned over stably.

Preferably, the first turnover part and the second turnover part are arranged to be perpendicular to each other. The first turnover part and the second turnover part which are arranged to be perpendicular to each other only need 90-degree rotation to realize the battery pack being turned over. Wherein, the charging ports of the battery packs at the first position and the fourth position are oriented horizontally to facilitate matching with electric vehicle, and the battery packs at the second position and the third position are oriented vertically to facilitate matching with charging equipment.

Preferably, the first turnover part and the second turnover part are driven by a same turnover driving device, or the first turnover part and the second turnover part are driven by different turnover driving devices.

Preferably, the turnover driving device comprises a telescopic rod, and the telescopic rod is connected with the first turnover part and/or the second turnover part and drives the first turnover part and the second turnover part to rotate. The telescopic rod generates the movement of the first turnover part and/or the second turnover part by expanding and contracting in its own length direction. The telescopic rod can be a pneumatic or hydraulic mechanism.

Preferably, the battery swapping device comprises a base, the first turnover part and the second turnover part are rotatably arranged relative to the base, wherein one end of the telescopic rod is rotatably connected with the bottom of the first turnover part and/or the second turnover part, and the other end of the telescopic rod is rotatably connected with the base.

Preferably, the turnover driving device comprises a turnover motor and a gear set, the turnover motor drives the gear set to rotate, and the gear set is connected with the first turnover part and/or the second turnover part and drives the first turnover part and/or the second turnover part to rotate.

Preferably, the turnover driving device comprises a turnover motor and a gear set, wherein the gear set at least comprises an input gear and an output gear, the input gear and the output gear are gear connected with each other, wherein the turnover motor directly or indirectly drives the input gear to rotate, the first turnover part and the second turnover part are fixedly connected with the output gear by turning shafts, and rotate with the output gear. The input gear and the output gear can generate output directly between themselves or by other gears.

Preferably, the turnover mechanism comprises a base, the first turnover part and the second turnover part are rotatably connected with the base, and the turnover driving device drives the first turnover part and the second turnover part to rotate.

Preferably, the first turnover part and the second turnover part are both connected with a rotational plate, and the turnover driving device is connected with the rotational plate and drives the rotational plate to rotate. The rotational plate is used as a shared part of the first turnover part and the second turnover part, so just driving the rotational plate, it can simultaneously drive the first turnover part and the second turnover part. Meanwhile, the rotational plate can also be used for carrying the battery pack.

Preferably, the battery swapping device comprises an outer frame and a lifting mechanism, and the base is connected with the outer frame by the lifting mechanism, and moves up and down relative to the outer frame. By the lifting mechanism, it can realize the position adjustment of the battery pack in the height direction, so as to the battery pack can be corresponding to the battery charging bins with different height.

Preferably, the lifting mechanism is connected with the outer frame by a chain transmission mechanism, and the lifting mechanism and the outer frame are guided between themselves by guide wheels. The chain transmission mechanism plays a role in lifting the turnover mechanism, and the guide wheel plays a role in smoothly guiding.

A battery swapping station, characterized in that, the battery swapping station comprises:

- a vehicle carrying platform for an electric vehicle parking to swap battery pack swapping;
- a charging equipment with a plurality of charging bins for placing battery pack, and an electrical connector is arranged in the charging bin, which is used for charging;
- the battery swapping device is used for picking, placing and transferring the battery between electric vehicle and battery charging bins, and the turnover mechanism is used for vertically turning the battery pack taken out of battery charging bins or electric vehicle.

A battery swapping method, characterized in that, the battery swapping method is implemented by the battery swapping device, which comprises:

- pulling out a used battery pack in an electric vehicle to the first position by the push-pull mechanism;
- turning the used battery pack taken out from the first position to the second position along the first direction;
- placing the used battery pack at the corresponding position in battery charging bin and putting the used battery pack into the battery charging bin for charging;

and/or

- taking out a fresh battery pack from the battery charging bin and placing it at the third position;
- turning the fresh battery pack taken out from the third position to the fourth position in the second direction;
- placing the fresh battery pack at the corresponding position in electric vehicle and pushing the fresh battery pack into the electric vehicle by means of the push-pull mechanism.

The positive and progressive technical effect of the present invention is: the turnover mechanism in the present invention can be significantly reduced with respect to a plane-rotating battery swapping device in structure. Thus, the battery swapping device of the present invention can complete picking and placing of larger battery packs in a charging station with a smaller space and structure. Therefore, battery swapping of an electric vehicle with a single large battery pack can be realized in a smaller area of the battery swapping station, thereby reducing the cost of the battery pack and facilitating promotion.

DETAILED DESCRIPTION OF THE PREFERRED EMBODIMENT

Embodiment 1

Figure 1:
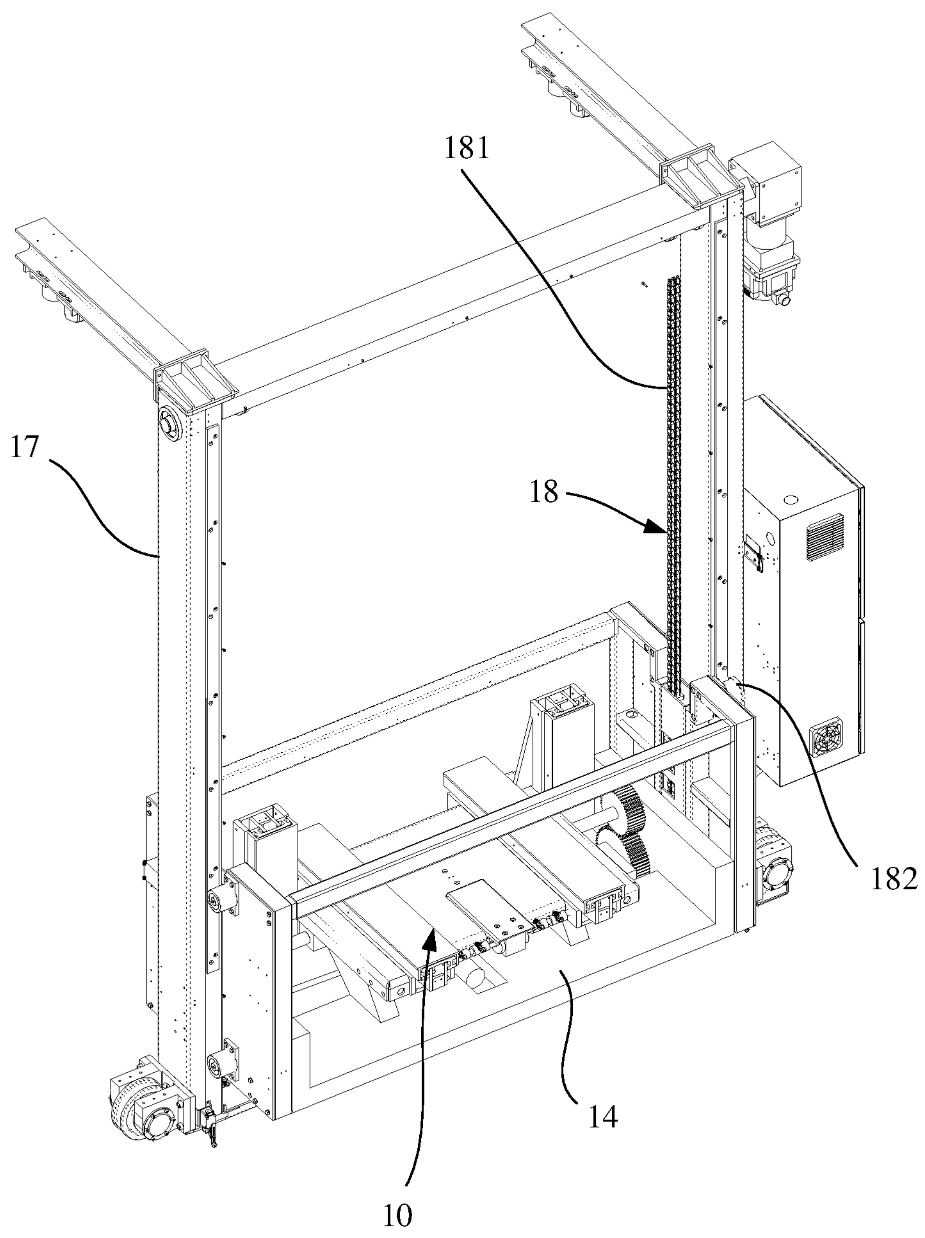
FIG. 1 is a structural diagram of the overall structure of a battery swapping device according to Embodiment 1 of the present invention.

As shown in FIGS. 1-9, this embodiment discloses a battery swapping device 1, which is used to transfer battery pack 4 between electric vehicle 3 and a battery charging bin, the battery swapping device 1 comprises a turnover mechanism 10, and the turnover mechanism 10 is used for turning a used battery pack 4 taken out of an electric vehicle from a first position to a second position in a first direction; or the battery swapping device 1 is used for turning a fresh battery pack 4 taken out of a battery charging bin from a third position to a fourth position in a second direction, the first direction is opposite to the second direction.

In this embodiment, the battery pack 4 is installed on the electric vehicle 3 to provide power, and a battery charging bin is arranged in the battery swapping station to provide charging and discharging services for battery packs, when the battery pack on the vehicle is insufficient to supply power to the electric vehicle to continue driving, then it is necessary to swap battery in the battery swapping station timely, the battery swapping device in this solution is used as side battery swapping for electric vehicle, the battery swapping device is arranged in the battery swapping station, which is with both battery picking and placing function and battery transfer function, that is, the battery swapping device can pick and place the battery pack in both the electric vehicle and the battery charging bin, and it also can transfer the battery pack between the electric vehicle and the battery charging bin, to transfer the used battery pack from the electric vehicle to the battery charging bin, and transfer the fresh battery from the battery charging bin to the electric vehicle, in the prior art, the used battery pack taken out of the electric vehicle needs to be rotated 180 degrees before being transferred to the battery charging bin, so that the battery pack charging port is horizontally connected with the electrical connector at the inner side of the battery charging bin to realize the electrical connection, while the battery pack for commercial vehicles is with the characteristics of long length but narrow width, if horizontally rotate the battery pack of commercial vehicle, then the diameter of the space it required at least must be greater than the dimension of the battery pack in its length direction, which leads to requiring a larger rotation space for battery transfer, and requiring a larger occupied area, in this embodiment, by turning the battery pack 90 degrees along a turning shaft, the charging port of the battery pack is orientated upwards, to make it to be vertically connected with the electrical connector at the top side in the battery charging bin to realize electrical connection, so as to charge or discharge for the battery pack. For the turnover solution for the battery pack in this embodiment, the required occupying space is significantly reduced than the required space at a way of rotating 180 degrees horizontally, which saves the space for transferring battery pack, and saves the occupied area of the battery swapping station.

In other embodiments, the battery swapping device may only have a battery transfer function, and an individual battery picking and placing mechanism performs the action of picking and placing the battery from electric vehicle and battery charging bin.

In this embodiment, the first position is the initial position of the used battery pack 4 taken out of electric vehicle on the turnover mechanism 10, the second position is the position of the used battery pack 4 on the turnover mechanism 10 after it is turned over along the first direction, the third position is the initial position of the fresh battery pack 4 taken out of the battery charging bin on the turnover mechanism 10, and the fourth position is the position of the fresh battery pack 4 on the turnover mechanism 10 after it is turned over along the second direction, wherein the used battery pack 4 does not refer to a battery pack with zero power, but comprises the situation where the remaining power of the battery pack 4 is not enough to supply power to the vehicle for continual driving, the fresh battery pack 4 is not a battery pack with 100% power, but comprises the situation where the power of the battery pack 4 is sufficient to supply power to the vehicle for continual driving.

By using the turnover mechanism 10 in this solution, the battery pack 4 is turned over during the process of transferring the battery pack between the electric vehicle 3 and the battery charging bin, so as to adapt to different orientations of the electric connectors in the electric vehicle and the battery charging bin.

The turnover mechanism in the present invention rotates the battery pack 4 as a way of turnover. The battery pack 4 itself requires less space to turn over, and the turnover mechanism can be significantly reduced with respect to a plane-rotating battery swapping device in structure. Thus, the battery swapping device 1 of the present invention can complete picking and placing of larger battery packs in a charging station with a smaller space and structure. Therefore, battery swapping of an electric vehicle 3 with a single large battery pack 4 can be realized in a smaller area of the battery swapping station, thereby reducing the cost of the battery pack 4 and facilitating the promotion.

Figure 2:
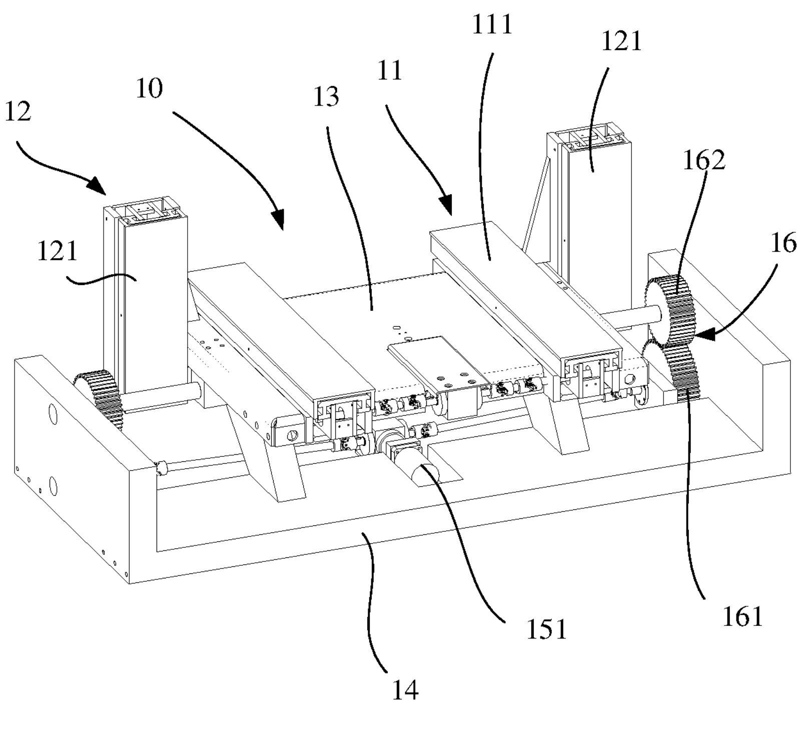
FIG. 2 is a structural diagram of the overall structure of the turnover mechanism according to Embodiment 1 of the present invention.
Figure 3:
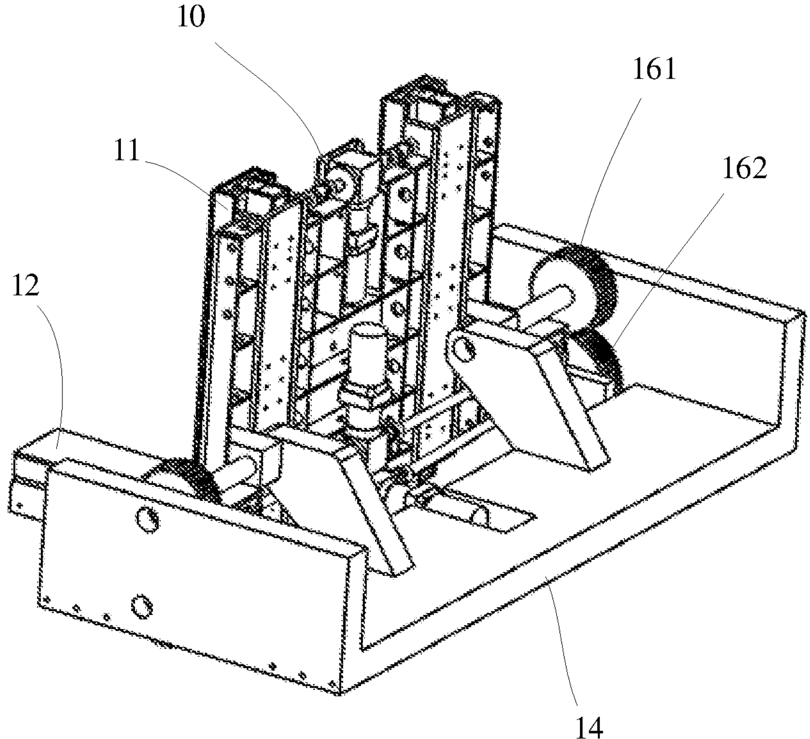
FIG. 3 is a structural diagram of the turnover mechanism turning 90 degrees according to Embodiments 1 and 3 of the present invention.

As shown in FIG. 2 and FIG. 3 the turnover mechanism 10 of this embodiment comprises a first turnover part 11 and a second turnover part 12, the first turnover part 11 is used for carrying the battery pack 4 located at the first position or the fourth position, the second turnover part 12 is used for carrying the battery pack 4 located at the second position or the third position, and the first turnover part 11 and the second turnover part 12 turn coaxially. The first turnover part and the second turnover part 12 respectively realize the carrying of the battery pack 4 at different positions, which are corresponding to the picking and placing of the battery pack 4 respectively at the electric vehicle 3 side and the charging bin side. Wherein, the first turnover part 11 is matched with the electric vehicle 3 when facing the first position and the fourth position to realize the picking and placing of the battery pack 4, and the second turnover part 12 is matched with the battery charging bin when facing the second position and the third position to realize the picking and placing of the battery pack 4.

Wherein, the first position and the fourth position can be same position, the second position and the third position can be same position. As shown in FIGS. 2 and 3, in this embodiment, the first position and the fourth position are at same position, that is, the first turnover part 11 is kept horizontally at the first position and the fourth position, and the second turnover part 12 is kept vertically at the first position and the fourth position. In this embodiment, the second position and the third position are same position, that is, the first turnover part 11 is kept vertically at the second position and the third position, and the second turnover part 12 is kept horizontally at the second position and the third position. Thus, the turnover of the turnover mechanism is implemented mainly between the two positions.

Figure 7:
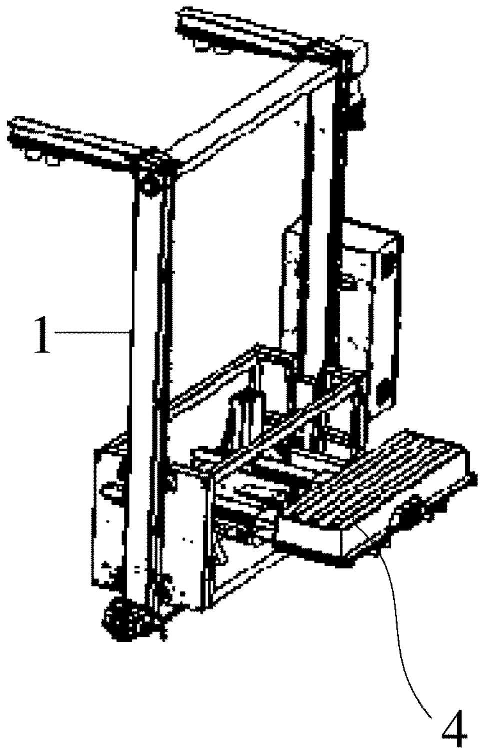
FIG. 7 is a diagram of the turnover mechanism taking out battery pack according to Embodiment 1 of the present invention.
Figure 8:
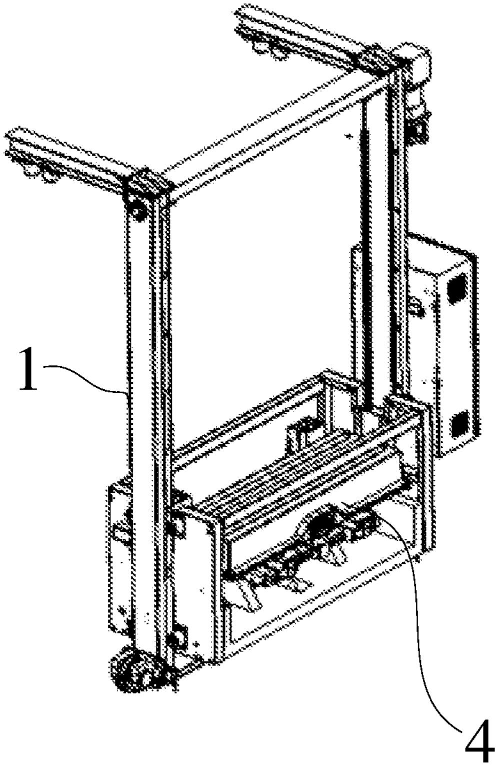
FIG. 8 is a diagram of the turnover mechanism picking battery pack according to Embodiment 1 of the present invention.

As shown in FIGS. 2, 7 and 8, the battery pack 4 of this embodiment has a first side and a second side which are perpendicular to each other. when the battery pack 4 is at the first position or the fourth position, the first side is carried on the first turnover part 11, and the second side is abutted on the second turnover part 12; when the battery pack 4 is at the second position or the third position, the second side is carried on the second turnover part 12, and the first side is abutted on the first turnover part 11. The first turnover part 11 and the second turnover part 12 are matched with each other to realize the roles of limiting position and abutting for the two sides of the battery pack 4. Thus, when the battery pack 4 is turned over, it can avoid the shaking of the battery pack 4 and ensure stable turning of the battery pack 4.

As shown in FIG. 2 and FIG. 3, the first turnover part 11 and the second turnover part 12 are arranged to be perpendicular to each other. The first turnover part 11 and the second turnover part 12 which are arranged to be perpendicular to each other need only 90-degree turnover, then they can realize the rotation of the battery pack 4. Wherein, the charging ports of the battery packs 4 at the first position and the fourth position are oriented horizontally to facilitate matching with the connector of electric vehicles 3, and the battery packs 4 at the second position and the third position are oriented vertically to facilitate matching with charging equipment 2.

In this embodiment, the first turnover part 11 and the second turnover part 12 are driven by a same turnover driving device, or the first turnover part 11 and the second turnover part 12 are driven by different turnover driving devices. By the same turnover driving device, it can simultaneously drive the movement of the first turnover part 11 and the second turnover part 12, while by different turnover driving devices, they can control the movement of the first turnover part 11 and the second turnover part 12 respectively.

Figure 4:
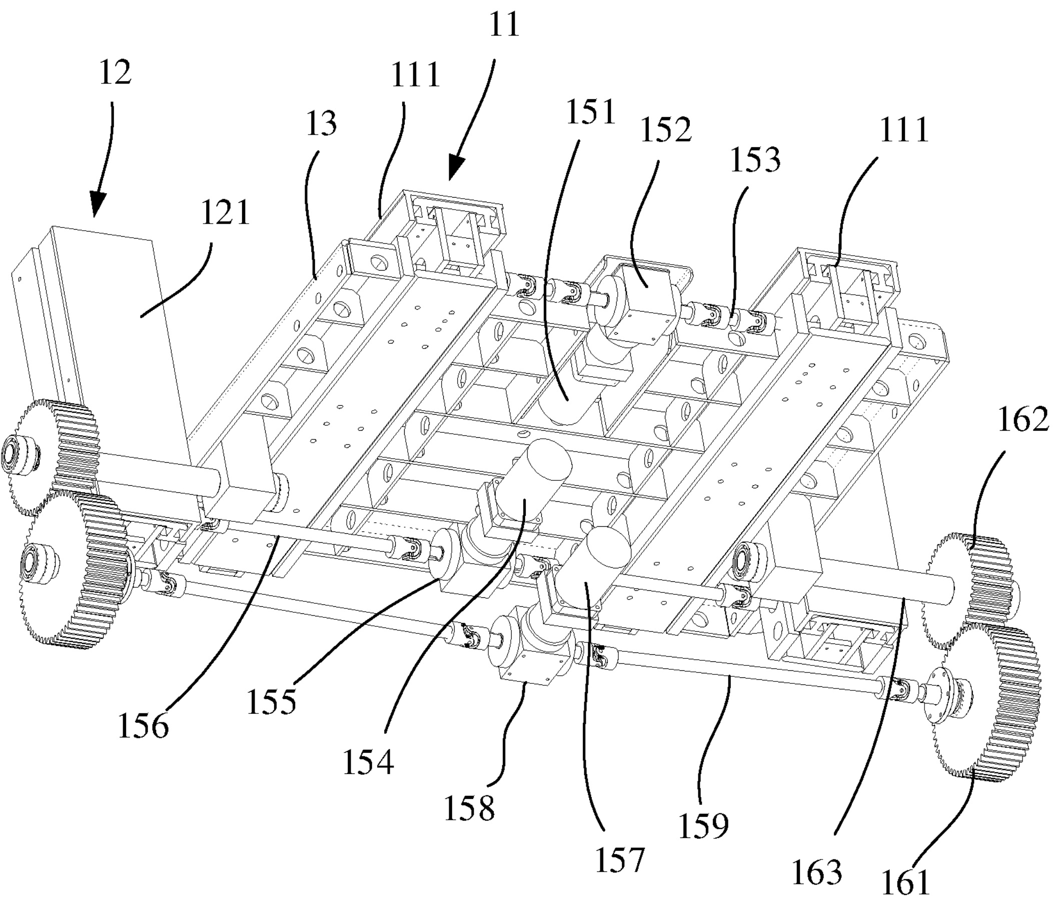
FIG. 4 is a structural diagram of the bottom of the turnover mechanism according to Embodiments 1 and 3 of the present invention.

As shown in FIG. 2 and FIG. 4, the turnover driving device of this embodiment comprises a turnover motor 157 and a gear set 16, the turnover motor 157 drives the gear set 16 to rotate, and the gear set 16 is connected with the first turnover part 11 and/or the second turnover part 12 and drives the first turnover part 11 and/or the second turnover part 12 to rotate. The turnover motor 157 drives the gear set 16 to rotate by its own rotation, so that the first turnover part 11 and/or the second turnover part 12 rotate following with it. The turnover motor 157 can ensure that the first turnover part 11 and/or the second turnover part 12 are turned over to an accurate position by controlling its own rotation amount. Wherein, the turnover motor 157 is connected with the transmission shaft 159 by a direction shifter 158 to drive the gear set 16 to rotate.

As shown in FIG. 2 and FIG. 4, the turnover driving device in this embodiment comprises a turnover motor 157 and a gear set 16, wherein, the gear set 16 at least comprises an input gear 161 and an output gear 162, the input gear 161 and the output gear 162 are gear connected with each other, wherein the turnover motor 157 directly or indirectly drives the input gear 161 to rotate, and the first turnover part 11 and the second turnover part 12 are fixedly connected with the output gear 162 by a turning shaft, and rotate following with the output gear 162. The input gear 161 and the output gear 162 can directly generate output just between themselves or transfer by other gears. The input gear 161 and the output gear 162 are driven to transmit between themselves by a gear transmission way, which can act as a deceleration mechanism and increase the output torque at the same time, so that it can drive the first turnover part 11 and the second turnover part 12. As shown in FIG. 2 and FIGS. 4, the first turnover part 11 of this embodiment comprises a first extension mechanism 111 and a rotational plate 13, and the second turnover part 12 comprises a second extension mechanism 121 and the rotational plate 13. Wherein, the rotational plate 13 in this embodiment is the part shared by the first turnover part 11 and the second turnover part 12. It can also be understood that the first turnover part 11 comprises the first extension mechanism 111 and the rotational plate 13, and the second turnover part 12 only comprises the second extension mechanism 121; or it can be understood that the first turnover part 11 only comprises the first extension mechanism 111, and the second turnover part 12 comprises a second extension mechanism 121 and a rotational plate 13.

The bottom of the rotational plate 13 is connected with the output gear 162 by a rotating shaft 163. Therefore, when rotating, the rotational plate 13 also rotates together. At this moment, the first turnover part 11 and the second turnover part 12 realize simultaneously turning over.

The turnover driving device is connected with the rotational plate 13 and drives the rotational plate 13 to rotate. The rotational plate 13 is used as a shared part of the first turnover part 11 and the second turnover part 12, so just driving the rotational plate 13, it can simultaneously drive the first turnover part 11 and the second turnover part 12. Meanwhile, the rotational plate 13 can also be used for carrying the battery pack 4.

As shown in FIG. 2 and FIG. 4, an extension mechanism is arranged on the first turnover part 11 and/or the second turnover part 12 in this embodiment for taking out the battery pack 4 located at the electric vehicle 3 or the battery charging bin and placing it at the first position or the third position on the turnover mechanism, or placing the battery pack 4 at the fourth position or the second position of the turnover mechanism into the electric vehicle 3 or the battery charging bin. The extension mechanism realizes the battery packs located at different positions on the turnover mechanism matching with the electric vehicle 3 or the battery charging bin respectively, thereby realize the picking and placing or transferring for the battery pack 4.

Figure 5:
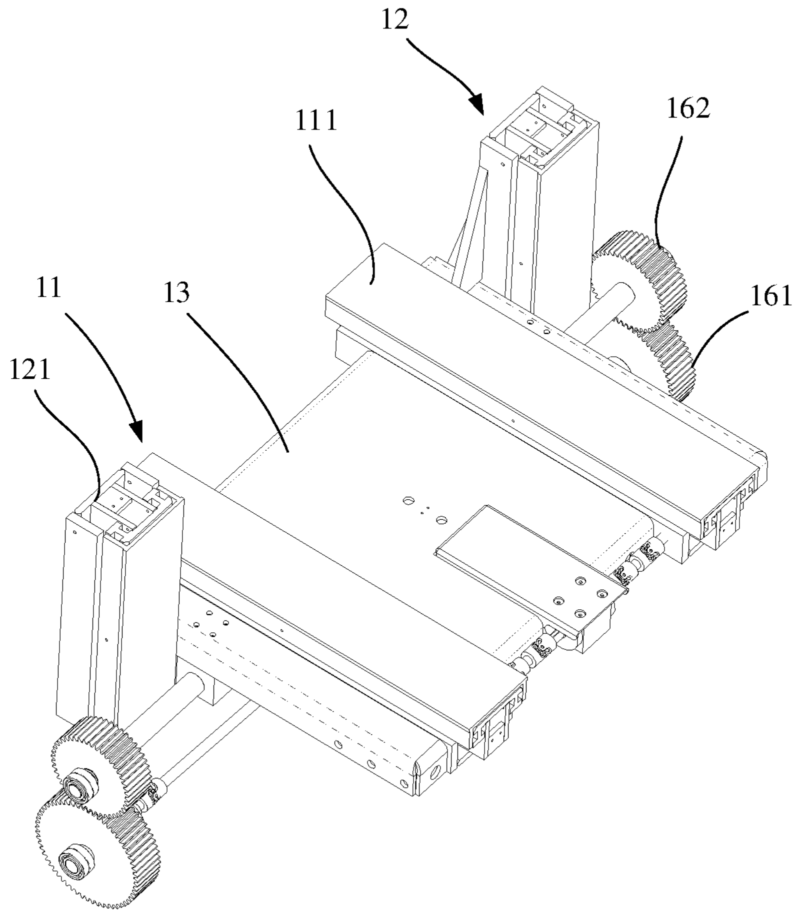
FIG. 5 is a structural diagram of the top of the turnover mechanism according to Embodiment 1 of the present invention.
Figure 6:
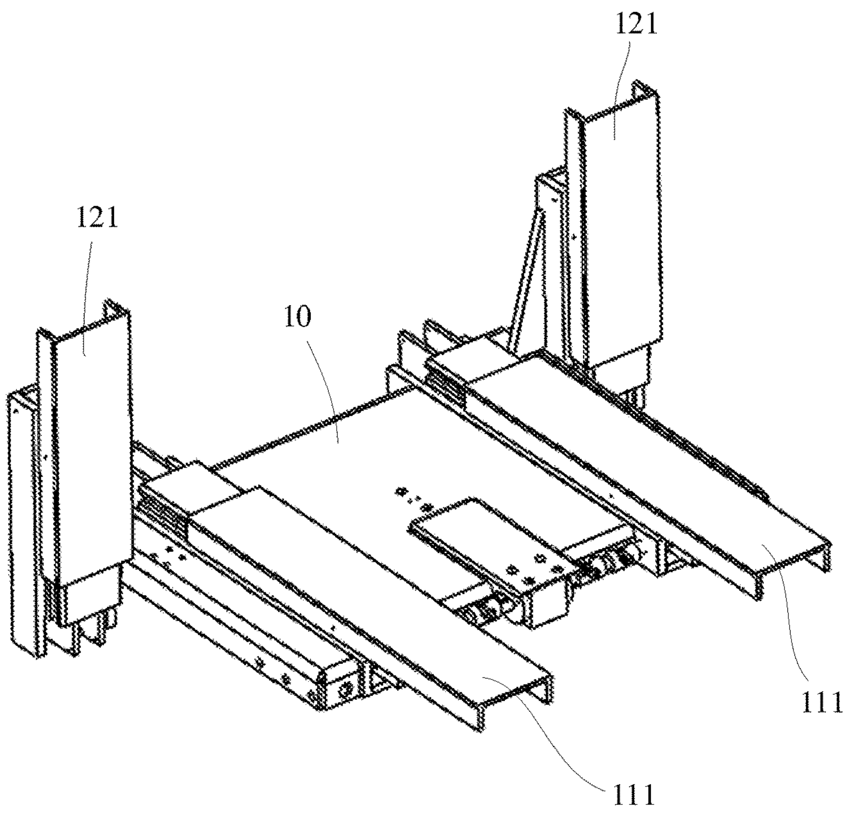
FIG. 6 is a diagram of the extension mechanism at extension state according to Embodiments 1 and 3 of the present invention.

As shown in FIG. 5 and FIG. 6, the first turnover part 11 of this embodiment comprises a first extension mechanism 111, and the second turnover part 12 comprises a second extension mechanism 121. Wherein, the first extension mechanism 111 is connected onto the upper surface of the rotational plate 13, and the second extension mechanism 121 is connected to the both sides of the rotational plate 13. The first extension mechanism 111 and the second extension mechanism 121 can be extended out as shown in FIG. 6. Wherein, the first extension mechanism 111 picks and places the battery pack 4 at the first position or the fourth position 111 and the second extension mechanism 121 picks and places the battery pack 4 at the second position or the third position. Wherein, the first extension mechanism 111 is matched with the electric vehicle 3 to realize picking and placing of the battery pack 4, the second extension mechanism 121 is matched with the battery charging bin to realize picking and placing of the battery pack 4.

Figure 9:
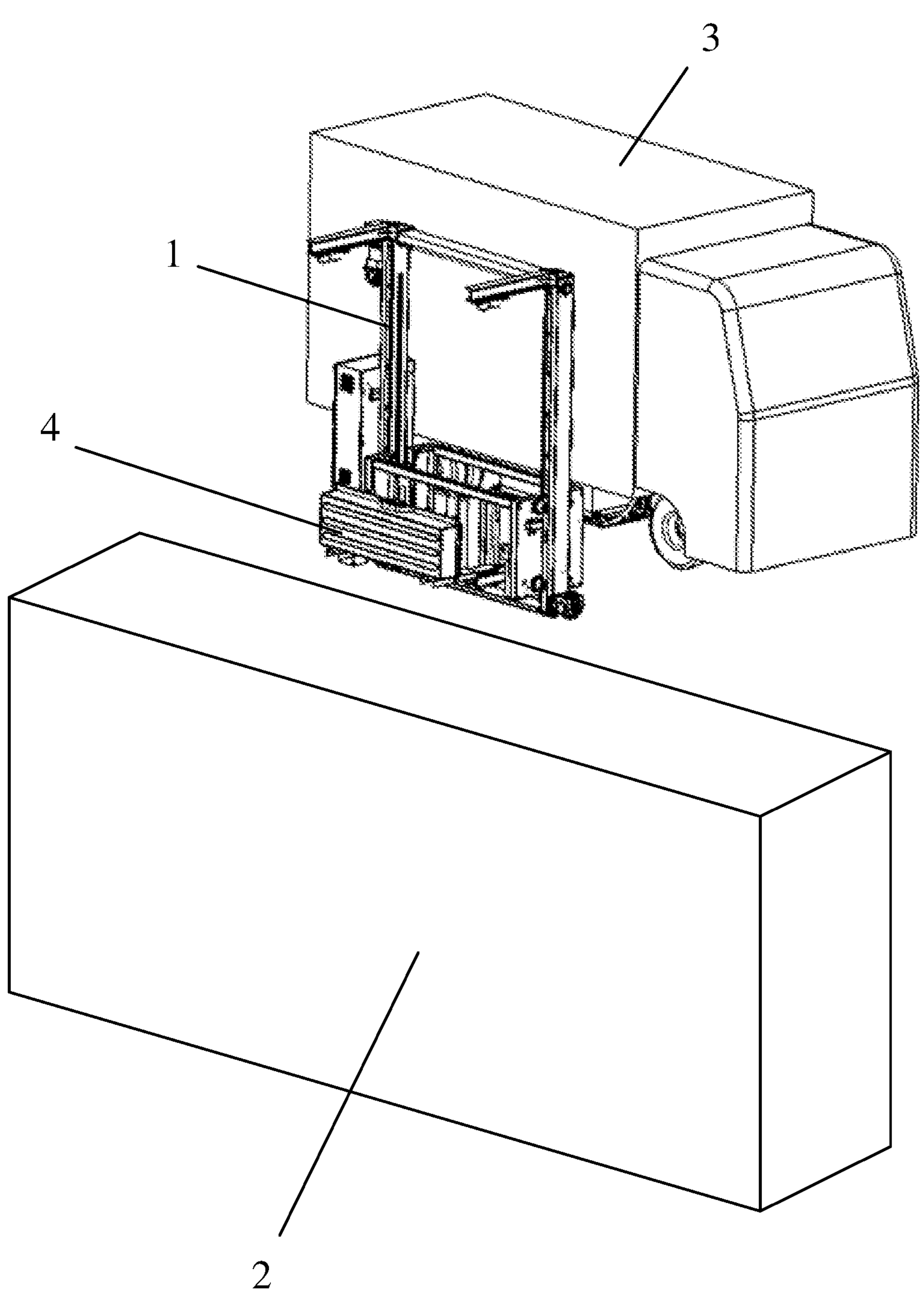
FIG. 9 is a diagram of a battery swapping station according to Embodiment 1 and Embodiment 3 of the present invention.

As shown in FIG. 7 and FIG. 8, when taking out the battery, the first extension mechanism 111 takes the battery pack out of the electric vehicle 3, then retracts and places the battery pack 4 at the first position on the first turnover part 11, as shown in FIGS. 3 and 9, after the turnover mechanism is driven to turn 90 degrees along the first direction, the battery pack 4 is located at the second position of the second turnover part 12, and the second extension mechanism 121 extends out to put the battery pack 4 located at the second position into the corresponding battery charging bin, and the second extension mechanism 121 is retracted back to the initial position. When putting on the battery, battery swapping device 1 moves to the battery charging bin storing with the fresh battery pack 4, and the second extension mechanism 121 extends out to take the fresh battery pack 4 out of the battery charging bin, as shown in FIG. 3 and FIG. 9, retracts and places the battery pack 4 at the third position on the second turnover part 12, then after driving the turnover mechanism 10 to turn 90 degrees along the second direction, as shown in FIG. 8, the battery pack 4 is located at the fourth position on the first turnover part 11, as shown in FIG. 7, the first extension mechanism 121 puts the battery pack 4 at the fourth position into the electric vehicle 3, then the first extension mechanism 121 retracts to the initial position.

Preferably, the extension direction of the first extension mechanism 111 and the extension direction of the second extension mechanism 121 are intersected, so that the battery pack 4 is relayed between the first extension mechanism 111 and the second extension mechanism 121. The battery pack 4 naturally contacts the second extension mechanism 121 after being transported to the end of the first extension mechanism 111. After it is turned over, the second extension mechanism 121 straightly carries the battery pack 4 for transportation. On the contrary, the battery pack 4 naturally contacts the first extension mechanism 111 after being transported to the end on the second extension mechanism 121. And after it is turned over, the first extension mechanism 111 straightly carries the battery pack 4 for transportation.

In this embodiment, both the first extension mechanism 111 and the second extension mechanism 121 are telescopic forks. The telescopic fork can be any existing equipment that can realize expanding and contracting in its length direction. The first extension mechanism 111 and the second extension mechanism 121 in this embodiment are track structures that can be extended out and internally driven by the structure such as electromagnetic force, belt pulley, chain wheel, or gear. Wherein, the transmission shaft 153 and the transmission shaft 156 are respectively connected with the internal structures of the first extension mechanism 111 and the second extension mechanism 121 During operation, the rotation generated by the transmission shaft 153 and the transmission shaft 156 is transformed into the extension and retraction motion of the first extension mechanism 111 and the second extension mechanism 121 by structures such as electromagnetic force, belt pulley, chain wheel, or gear.

As shown in FIG. 2 and FIG. 4, the battery swapping device 1 in this embodiment further comprises a first transmission motor 151 and a second transmission motor 154 respectively, and both the first transmission motor 151 and the second transmission motor 154 are connected to the bottom of the rotational plate 13. Wherein, the first transmission motor 151 directly or indirectly drives the first extension mechanism 111, and the second transmission motor 154 directly or indirectly drives the second extension mechanism 121. Wherein, as shown in FIG. 4, the first transmission motor 151 is connected with the transmission shaft 153 by the direction switcher 152, so as to drive the first extension mechanism 111 to move. And the second transmission motor 154 is connected with the transmission shaft 156 by the direction switcher 155, so as to drive the second extension mechanism 111 to move. Wherein, the inside structure of the direction switcher 152 and the direction switcher 155 can be bevel gears etc, which makes the movement shafts of the first transmission motor 151 and the second transmission motor 154 to realize 90 degrees switching, and then drive the first extension mechanism 111 and the second extension mechanism 121 by the transmission shaft 153 and the transmission shaft 156.

In this embodiment, the battery swapping device 1 further comprises a limit sensor, and the limit sensor may be a limit switch or a distance sensor etc. Wherein, the limit sensor can be arranged on the non-moving part of the first extension mechanism 111 to detect the moving distance or position of the moving part of the first extension mechanism, and the limit sensor can also be arranged on the rotational plate 13 to detect the moving distance or position of the moving part of the first extension mechanism. The limit sensor is used to detect the extension distance of the first extension mechanism 111 and the second extension mechanism 121, and adjust the extension distance of the first extension mechanism 111 and the second extension mechanism 121 respectively by the first transmission motor 151 and the second transmission motor 154. For example, when the detected extension distance of the first extension mechanism 111 is less than the set distance, the first transmission motor 151 will continue to rotate to reach the preset position, thereby achieve closed-loop control and ensure the first extension mechanism 111 and the second extension mechanism 121 are accurately in place.

In this embodiment, the battery swapping device 1 further comprises a turnover-in-position sensor, the turnover-in-position sensor is used for detecting the turning angle of the first turnover part 11 and the second turnover part 12, and adjusting the turning angle of the first turnover part 11 and the second turnover part 12 by turnover motor 157. The turnover-in-position sensor can be a limit switch, an angle sensor, a grating ruler, etc. Wherein, turnover-in-position sensor may be arranged on the base 14 to detect the turning angle of the rotational plate 13 so as to obtain the turning angles of the first turnover part 11 and the second turnover part 12. For example, when the detected rotational plate 13 is smaller than the set turnover angle, the turnover motor 157 will continue to rotate to reach the preset position, thereby realize closed-loop control and ensure the accurate position the first turnover part 11 and the second turnover part 12. As shown in FIG. 2 and FIG. 3, the turnover mechanism 10 of this embodiment comprises a base 14, The rotational plate 13 is rotatably connected with the base 14, whereby the first turnover part 11 and the second turnover part 12 are rotatably connected with the base 14, and the turnover driving device (the turnover motor 157 and the gear set 16) drives the first turnover part 11 and the second turnover part 12 to rotate. Wherein, the turnover motor 157 is connected with the rotational plate 13 and the gear set is connected with the base 14.

As shown in FIG. 1, the battery swapping device 1 of this embodiment comprises an outer frame 17 and a lifting mechanism 18, and the base 14 is connected with the outer frame 17 by the lifting mechanism 18, and moves up and down relative to the outer frame 17. By the lifting mechanism 18, it can realize the position adjustment of the battery pack 4 in the height direction, so as to the battery pack can be corresponding to the battery charging bins with different height. The outer frame 17 itself can be provided with a horizontal movement mechanism, which can realize the movement of the battery swapping device 1 between the electric vehicle 3 and battery swapping device 2 by moving on the track or on the ground.

As shown in FIG. 1, the lifting mechanism 18 of this embodiment is connected with the outer frame 17 by a chain transmission mechanism 181, and the lifting mechanism 18 and the outer frame 17 are guided by a guide wheel 182 between themselves. The chain transmission mechanism 181 plays a role in lifting the turnover mechanism, and the guide wheel 182 plays a role in smoothly guiding.

As shown in FIG. 9, this embodiment also discloses a battery swapping station, the battery swapping station comprises: a vehicle carrying platform for parking the electric vehicle 3 to swap the battery pack 4; a charging equipment 2, the charging equipment 2 is with a plurality of battery charging bin, which is used to store the battery pack 4, and the battery charging bin is equipped with an electrical connector for electric connection with the battery pack 4 located in the battery charging bin for charging; the battery swapping device 1 is used for picking, placing and transferring the battery pack between the electric vehicle 3 and the battery charging bin, and the turnover mechanism 10 is used for vertically turning the battery pack 4 taken out of the battery charging bin or the electric vehicle.

This embodiment also discloses a method for battery swapping method, comprising:

- taking out a used battery pack from the electric vehicle and place it at the first position; specifically, the used battery pack 4 can be taken out from the electric vehicle by the first extension mechanism 111 or an independent battery picking and placing mechanism and placed at the first position on the turnover mechanism 10;
- turning the used battery pack from the first position to the second position along the first direction; specifically, controlling the turnover mechanism 10 to turn in the first direction, so that the first extension mechanism 111 and the second extension mechanism 121 rotate together, then the used battery pack 4 taken out can be turned from the first position to the second position in the first direction;
- putting the used battery pack at the second position into the battery charging bin for charging, and/or taking out the fresh battery pack from the battery charging bin and placing it at the third position; specifically, putting the used battery pack 4 at the second position into the battery charging bin for charging by the second extension mechanism 121 or an independent picking and placing mechanism, and/or taking out the fresh battery pack 4 from the battery charging bin and placing it at the third position on the turnover mechanism 10;
- turning the fresh battery pack from the third position to the fourth position in the second direction; Specifically, controlling the turnover mechanism 10 to turn the fresh battery pack 4 from the third position to the fourth position in the second direction;
- putting the fresh battery pack at the fourth position into the electric vehicle; specifically, putting the fresh battery pack 4 at the fourth position into the electric vehicle by the first extension mechanism 111 or an independent battery picking and placing mechanism.

Embodiment 2

Figure 10:
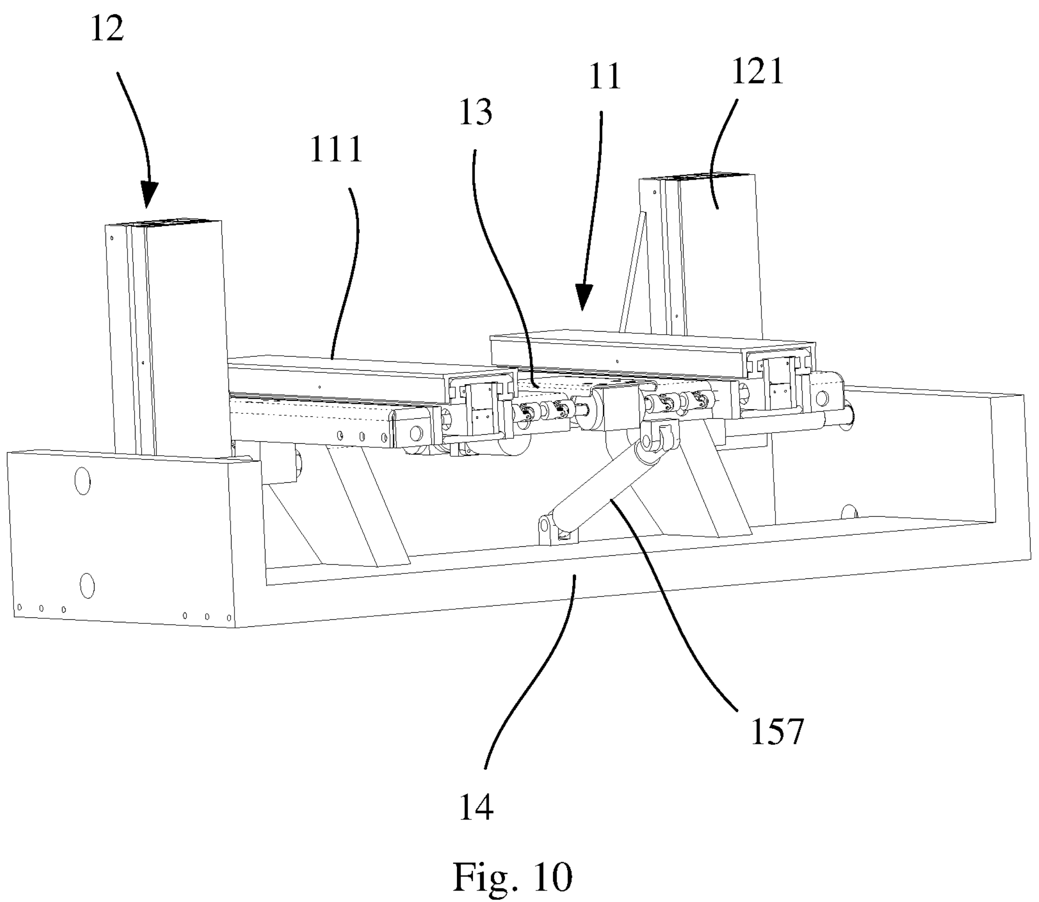
FIG. 10 is a structural diagram of the overall structure of the turnover mechanism according to Embodiment 2 and Embodiment 4 of the present invention.
Figure 11:
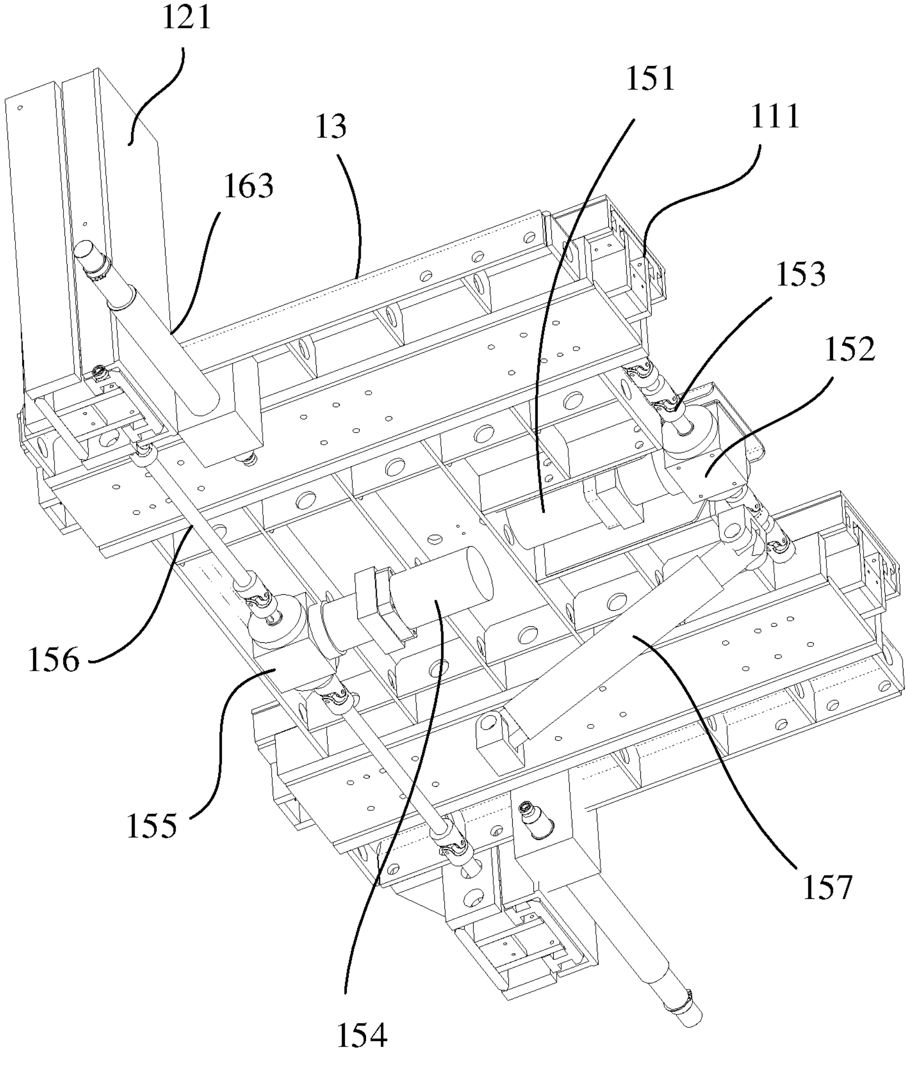
FIG. 11 is a structural diagram of the bottom structure of the turnover mechanism according to Embodiments 2 and 4 of the present invention.

As shown in FIG. 10 and FIG. 11, the difference between this embodiment and Embodiment 1 is that the turnover driving device in this embodiment is driven by a telescopic rod 157. Therefore, the turnover motor is not comprised in this embodiment. Wherein, as shown FIG. 10 and FIG. 11, the telescopic rod 157 in this embodiment is connected with the first turnover part 11 and/or the second turnover part 12 and drives the first turnover part 11 and the second turnover part 12 to rotate. The telescopic rod 157 generates the movement of the first turnover part 11 and the second turnover part 12 by expanding and contracting along its own length direction. The telescopic rod can be a pneumatic or hydraulic mechanism.

A plurality of telescopic rods 157 may be equipped, which are respectively connected with the first turnover part 11 and the second turnover part 12. It can also be set to connect both the first turnover part 11 and the second turnover part 12 simultaneously. Wherein, in this embodiment, since the bottoms of the first turnover part 11 and the second turnover part 12 are both connected with the base 14, by the telescopic rod 157 is connected with the base 14, it can realize simultaneous connection.

As shown in FIG. 10 and FIG. 11, the turnover mechanism 10 of this embodiment comprises a base 14, the first turnover part 11 and the second turnover part 12 are rotatably arranged relative to the base 14, wherein one end of the telescopic rod 157 is rotatably connected with the shared bottom (that is, the bottom of the rotational plate 13) of the first turnover part 11 and/or the second turnover part 12, and the other end of the telescopic rod 157 is rotatably connected with the base 14. The rotational plate 13 is connected with the rotation shaft 163, so that the rotational plate 13 is restricted to rotate around the axis of the winding shaft 163. The telescopic rod 157 can be extended and retracted so as to change the distance between the two ends, which is the distance between the turntable 13 and the base 14. The telescopic force generated by the telescopic rod 157 generates a torque relative to the rotating shaft 163, thereby driving the rotational plate 13 to rotate. Since the motion trajectories of the turntable 13 at all positions are arcs, the joint where the telescopic rod 157 connects with the turntable 13 moves as an arc followed with the turntable 13, so the two ends of the telescopic rod 157 are respectively connected in rotation to facilitate the telescopic rod 157 adjusting the inclining posture so as to rotate following with the rotational plate 13.

The movement in the length direction of the telescopic rod 157 itself, as well as the rotations of both ends can realize the synthesis of the motion, which can avoid jam during action, and smoothly realize the turnover of the first turnover part and 11 and the second turnover part 12.

Other parts in this embodiment use the same mechanism as that in Embodiment 1, or other alternative solutions that can be used in Embodiment 1, so there does not describe one by one in details.

The turnover mechanism of the present invention can be significantly reduced with respect to a plane-rotating battery swapping device in structure. Thus, the battery swapping device of the present invention can complete picking and placing of larger battery packs in a charging station with a smaller space and structure. Therefore, battery swapping of an electric vehicle with a single large battery pack can be realized in a smaller area of the battery swapping station, thereby reducing the cost of the battery pack and facilitating promotion.

Embodiment 3

As shown in FIG. 9, this embodiment discloses a battery swapping station for swapping the battery pack of the electric vehicle 3, that is, taking out the used battery pack and installing a fresh battery pack. The battery swapping station comprises: a vehicle carrying platform, a charging rack 2 and a battery swapping device 1.

The vehicle carrying platform is used as a place for parking an electric vehicle 3 which is to be swapped battery pack, and in this embodiment, it specifically refers to a dedicated parking area set on the ground.

The charging rack 2 overall presents as a cuboid, and is equipped with a plurality of battery charging bin for storing battery packs individually, here the battery pack can be a used battery pack just taken out of the electric vehicle 3, or it can be a fresh battery pack pre-configured in the battery swapping station. Moreover, each battery charging bin is provided with an electrical connector for realizing electrical connection with the electrical connector on the battery pack placed in the battery charging bin to charge the battery pack 4.

The battery swapping device 1 is used to take the used battery pack out of the electric vehicle 3 parked on the vehicle carrying platform and place it in the battery charging bin of the charging rack, and is also used to take the fresh battery pack out of the battery charging bin and install it into the electric vehicle 3. In other words, the battery swapping device 1 is able to pick, place and transfer the battery pack between the electric vehicle 3 and the battery charging bin.

Figure 12:
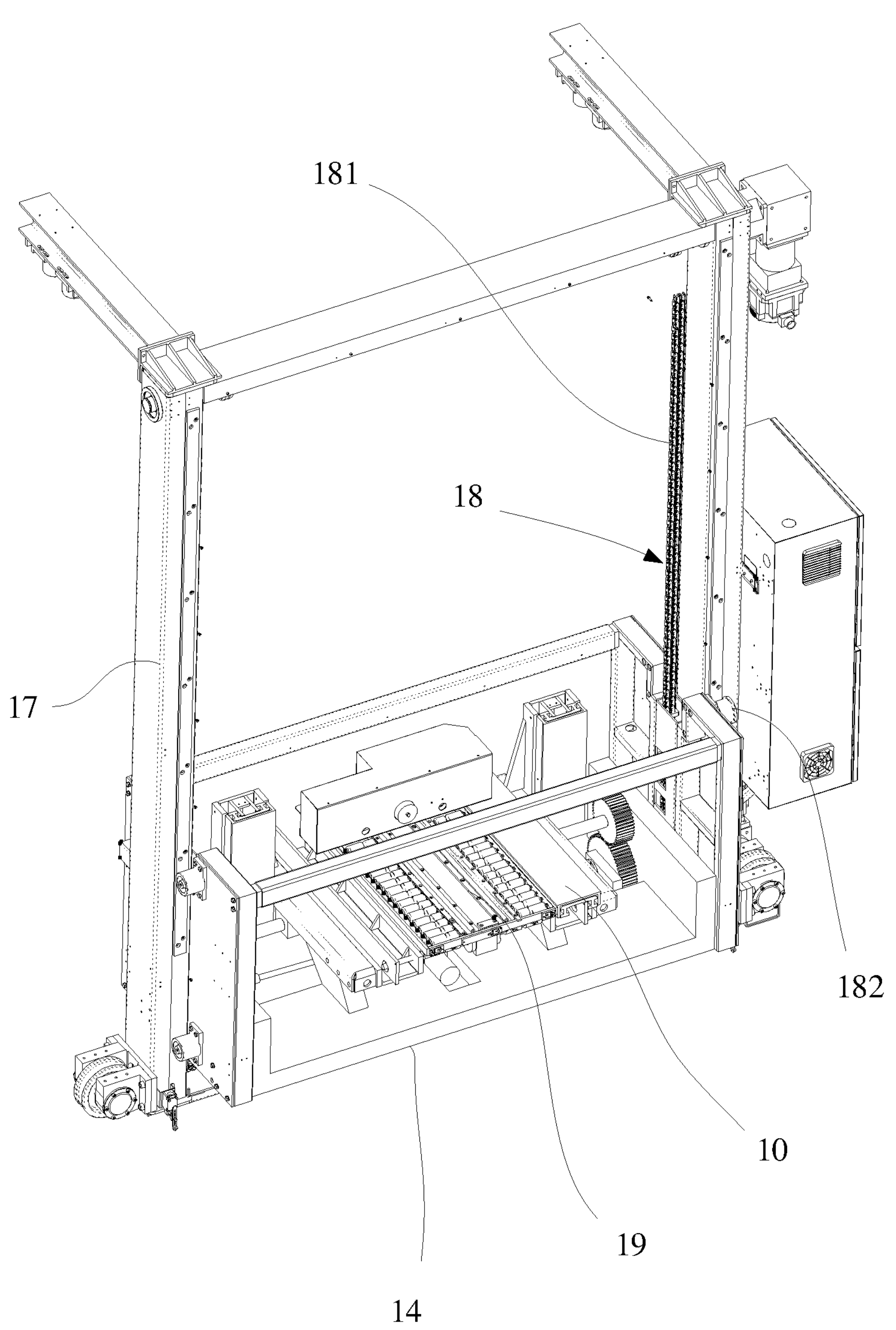
FIG. 12 is a structural diagram of the overall structure of the battery swapping device according to Embodiment 3 of the invention.

As shown in FIG. 12, the battery swapping device 1 comprises: an external frame 17, a base 14, a lifting mechanism 18, a turnover mechanism 10 and a push and pull mechanism 19. The turnover mechanism 10 is fixed on the base 14, the base 14 is connected with the outer frame 17 by the lifting mechanism 18, so that the base 14 is driven to move up and down relative to the outer frame 17 under the driving by the lifting mechanism 18, so as to adjust the height position of the battery pack being carried on the base 14, so that the battery pack can be corresponding to the charging bin with different heights.

The lifting mechanism 18 is connected with the outer frame 17 by a chain transmission mechanism 181, and the lifting mechanism 18 and the outer frame 17 are guided by guide wheels 182 between themselves. The chain transmission mechanism 181 plays a role in lifting the turnover mechanism, and the guide wheel 182 plays a role in smoothly guiding function. The outer frame 17 itself can be configured with a horizontal movement mechanism, which can realize the movement of the battery swapping device 1 between the electric vehicle 3 and the battery charging device 2 by moving on the track or on the ground.

In this embodiment, the first position is the initial position of the used battery pack 4 on the turnover mechanism 10 which is taken out from the electric vehicle, the second position is the position of the used battery pack 4 on the turnover mechanism 10 after it is turned over in the first direction, the third position is the initial position of the fresh battery pack 4 on the turnover mechanism 10 which is taken out from the battery charging bin, and the fourth position is the position of the fresh battery pack 4 on the turnover mechanism 10 after it is turned over in the second direction. wherein, the used battery pack 4 does not refer to a battery pack with zero power, but comprises the case that the remaining power of the battery pack 4 is not sufficient to power the vehicle to continue driving, and the fresh battery pack 4 is not a battery pack with 100% power, but comprises the case that the power of the battery pack 4 is sufficient to power the vehicle to continue driving.

Figure 13:
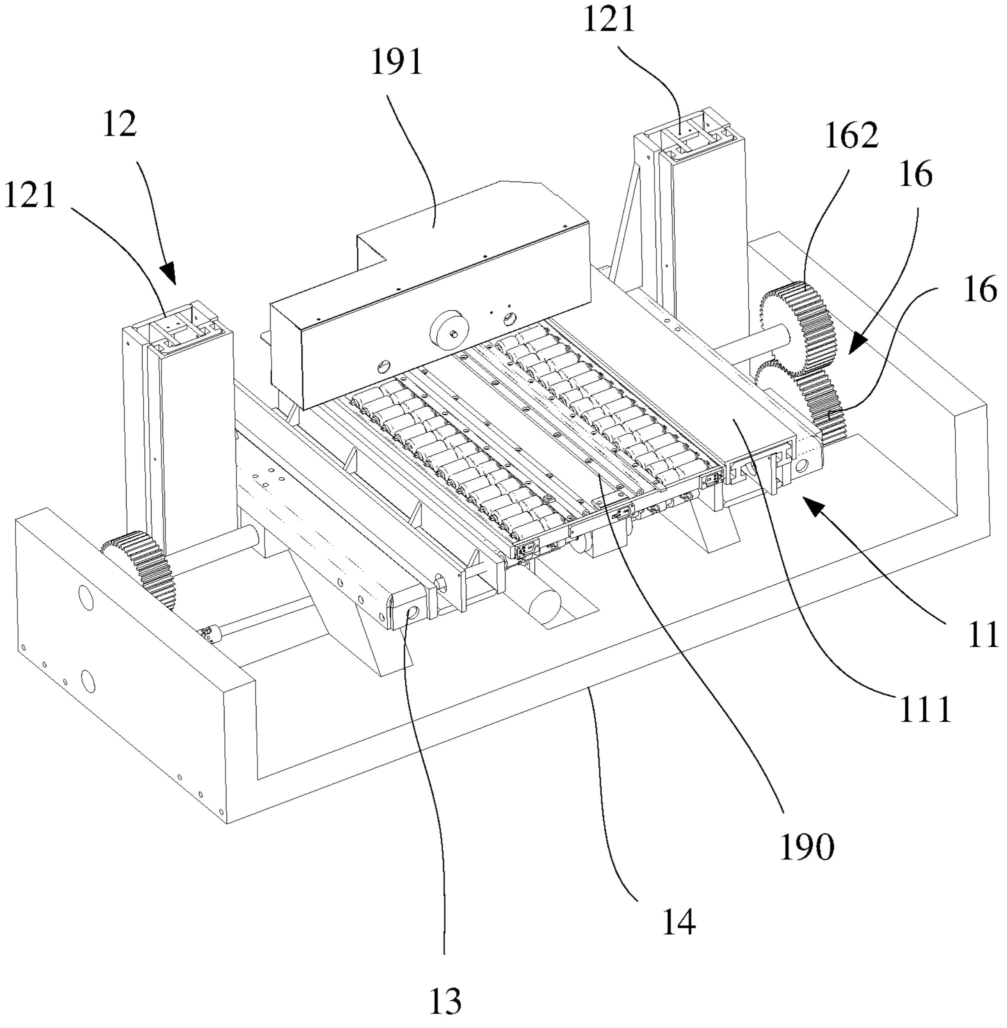
FIG. 13 is a partial structural diagram of the battery swapping device according to Embodiment 3 of the present invention.

As shown in FIG. 13, the turnover mechanism 10 is used for taking a used battery pack 4 out of an electric vehicle and drive the battery pack to turn from a first position to a second position in a first direction; and the turnover mechanism 10 is also used for taking a fresh battery pack 4 out of a battery charging bin and drive the battery pack to turn from a third position to a fourth position in a second direction. Here, the first direction is opposite to the second direction.

Specifically, the turnover mechanism 10 comprises a first turnover part 11 and a second turnover part 12. The first turnover part 11 and the second turnover part 12 respectively realize the carrying of the battery pack 4 at different positions, and respectively correspond to the taking and placing of the battery pack 3 on the electric vehicle 3 side and the charging bin side. Wherein, the first turnover part 11 is matched with the electric vehicle 3 when facing the first position and the fourth position to realize the picking and placing of the battery pack 4, and the second turnover part 12 is matched with the battery charging bin when facing the second position and the third position to realize the picking and placing of the battery pack 4.

In this embodiment, the first position and the fourth position can be same position, the second position and the third position can be same position. As shown in FIGS. 13 and 3, in this embodiment, the first position and the fourth position are at same position, then the first turnover part 11 is kept horizontally when the battery pack 4 is at the first position and the fourth position, and the second turnover part 12 is kept vertically when the battery pack 4 is at the first position and the fourth position. In this embodiment, the second position and the third position are same position, then the first turnover part 11 is kept vertically when the battery pack 4 is at the second position and the third position, and the second turnover part 12 is kept horizontally when the battery pack 4 is at the second position and the third position. Thus the turnover of the turnover mechanism 10 is implemented mainly between the two positions.

As shown in FIG. 13 and FIG. 3, the first turnover part 11 in this embodiment comprises a first extension mechanism 111, and the second turnover part 12 comprises a second extension mechanism 121, the push-pull mechanism 19 is connected with the first extension mechanism 111. Wherein, the first extension mechanism 111 is connected onto the upper surface of the rotational plate 13, and the second extension mechanism 121 is connected onto the both sides of the rotational plate 13. The first extension mechanism 111 and the second extension mechanism 121 can be extended out as a state shown in FIG. 6, thereby realizing forward and backward movement.

In this embodiment, both the first extension mechanism 111 and the second extension mechanism 121 are telescopic forks. The telescopic fork can be any existing equipment that can realize expanding and contracting in its length direction. The first extension mechanism 111 and the second extension mechanism 121 in this embodiment are track structures that can be extended out and internally driven by a structure like electromagnetic force, belt pulley, chain wheel, or gear. Wherein, the transmission shaft 153 and the transmission shaft 156 are respectively connected with the internal structures of the first extension mechanism 111 and the second extension mechanism 121. During operation, the rotation generated by the transmission shaft 153 and the transmission shaft 156 is transformed into the extension and retraction motion of the first extension mechanism 111 and the second extension mechanism 121 by structures such as electromagnetic force, belt pulley, chain wheel, or gear.

Wherein, the first extension mechanism 111 picks and places the battery pack 4 at the first position or the fourth position, and the second extension mechanism 121 picks and places the battery pack 4 at the second position or the third position.

Specifically, in this embodiment, when taking out the battery, the first extension mechanism 111 takes out the battery pack from the electric vehicle 3, then retracts and places the battery pack 4 at the first position on the first turnover part 11, as shown in FIGS. 12 and 13, the turnover mechanism is driven to turn 90 degrees along the first direction, then the battery pack 4 is located at the second position of the second turnover part 12, and the second extension mechanism 121 extends out and put the battery pack 4 at the second position into the corresponding battery charging bin, and then the second extension mechanism 121 is retracted back to the initial position. When replacing the battery, move the battery swapping device 1 to the battery charging bin storing fresh battery pack 4, and the second extension mechanism 121 extends out and takes out the fresh battery pack 4 in the battery charging bin, as shown in FIG. 12 and FIG. 13, it retracts and places the battery pack 4 at the third position on the second turnover part 12, after driving the turnover mechanism 10 to turn 90 degrees along the second direction, the battery pack 4 is located at the fourth position of the first turnover part 11.

As shown in FIGS. 13 and 3, the battery pack 4 of this embodiment has a first side and a second side that are perpendicular to each other, when the battery pack 4 is located at the first position or the fourth position, the first side is carried on the first turnover part 11, and the second side is abutted on the second turnover part 12; when the battery pack is located at the second position or the third position, the second side is carried on the second turnover part 12, and the first side is abutted on the first turnover part 11. The first turnover part 11 and the second turnover part 12 are matched with each other to play the roles in limiting position and abutting for the two sides of the battery pack 4. Thus, when the battery pack 4 is turned over, it can avoid the shaking of the battery pack 4 and ensure stable turnover of the battery pack 4.

As shown in FIGS. 13 and 3, in this embodiment, the first turnover part 11 and the second turnover part 12 are arranged to be perpendicular to each other. The first turnover part 11 and the second turnover part 12 which are arranged to be perpendicular to each other need only 90-degrees turnover, then they can realize the rotation of the battery pack 4. Wherein, the charging ports of the battery packs 4 at the first position and the fourth position are oriented horizontally to facilitate matching with the electric vehicles 3, and the battery packs 4 at the second position and the third position are oriented vertically to facilitate matching with the charging rack.

As shown in FIGS. 13 and 3, in this embodiment, the first turnover part 11 and the second turnover part 12 are driven by same turnover driving device, or the first turnover part 11 and the second turnover part 12 are driven by different turnover driving devices.

As shown in FIGS. 13 and 3, in this embodiment, the turnover mechanism 10 comprises a base 14, the first turnover part 11 and the second turnover part 12 are rotatably connected with the base 14, and the turnover driving device drives the first turnover part 11 and the second turnover part 12 to rotate.

As shown in FIGS. 13 and 3, in this embodiment, both the first turnover part 11 and the second turnover part 12 are connected with a rotational plate 13, and the turnover driving device is connected with the rotational plate 13 and drives the rotational plate 13 to rotate. Wherein, the rotational plate 13 is used as a shared part of the first turnover part 11 and the second turnover part 12, by just driving the rotational plate 13, it can simultaneously drive the first turnover part 11 and the second turnover part 12. Meanwhile, the rotational plate 13 can also be used to carry the battery pack.

As shown in FIG. 3 and FIG. 4, the turnover driving device in this embodiment comprises a turnover motor and a gear set 16, wherein, the gear set 16 at least comprises an input gear 161 and an output gear 162, the input gear 161 and the output gear 162 are gear connected with each other, wherein, the turnover motor directly or indirectly drives the input gear 161 to rotate, the first turnover part 11 and the second turnover part 12 are fixedly connected with the output gear 162 by the turning shaft, and rotate following with the output gear 162. The input gear 161 and the output gear 162 can directly generate output just between themselves or transfer by other gears. Wherein, the turnover motor 157 is connected with the transmission shaft 159 by the direction shifter 158, so as to drive the gear set 16 to rotate.

As shown in FIG. 4, the turnover driving device comprises a turnover motor 157 and a gear set 16, the turnover motor drives the gear set 16 to rotate, and the gear set 16 is connected with the first turnover part 11 and/or the second turnover part 12 and drives the first turnover part 11 and/or the second turnover part 12 to rotate.

In this embodiment, the battery swapping device 1 further comprises a turnover-in-position sensor, the turnover-in-position sensor is used for detecting the turnover angle of the first turnover part 11 and the second turnover part 12, and adjusting the turning angle of the first turnover part 11 and the second turnover part 12 by the turnover motor 157. The turnover-in-position sensor can be a limit switch, an angle sensor, a grating ruler, etc. Wherein, turnover-in-position sensor may be arranged on the base 14 to detect the turning angle of the rotational plate 13 so as to obtain the turning angles of the first turnover part 11 and the second turnover part 12. For example, when detecting the turning angle of the rotational plate 13 is smaller than the set turnover angle, then make the turnover motor 157 to continue rotating to reach the preset position, thereby realizing closed-loop control and ensuring the accurate position of the first turnover part 11 and the second turnover part 12.

As shown in FIG. 4, the battery swapping device 1 in this embodiment further comprises a first transmission motor 151 and a second transmission motor 154 respectively, and both the first transmission motor 151 and the second transmission motor 154 are connected to the bottom of the rotational plate 13. Wherein the first transmission motor 151 directly or indirectly drives the first extension mechanism 111, and the second transmission motor 154 directly or indirectly drives the second extension mechanism 121. Wherein, as shown in FIG. 6, the first transmission motor 151 is connected with the transmission shaft 153 by the direction switcher 152, so as to drive the first extension mechanism 111 to move. The second transmission motor 154 is connected with the transmission shaft 156 by the direction switcher 155, so as to drive the first extension mechanism 111 to move.

Wherein, the internal structure of the direction switcher 152 and the direction switcher 155 can be a structure like bevel gears, etc., which make the movement shafts of the first transmission motor 151 and the second transmission motor 154 to realize 90 degrees switching, and then drive the first extension mechanism 111 and the second extension mechanism 121 by the transmission shaft 153 and the transmission shaft 156.

In this embodiment, the battery swapping device 1 further comprises a limit sensor, and the limit sensor may be a sensor like limit switch or distance sensor, etc. Wherein, the limit sensor can be arranged on the non-moving part of the first extension mechanism 111 to detect the moving distance or position of the moving part of the first extension mechanism, and the limit sensor can also be arranged on the rotational plate 13 to detect the moving distance or position of the moving part of the first extension mechanism. The limit sensor is used for detecting the extension distance of the first extension mechanism 111 and the second extension mechanism 121, and adjusting the extension distance of the first extension mechanism 111 and the second extension mechanism 121 by the first transmission motor and the second transmission motor respectively. For example, when detecting the extension distance of the first extension mechanism 111 is less than the set distance, then make the first transmission motor 151 to continue rotating to reach the preset position, thereby achieving closed-loop control and ensuring the first extension mechanism 111 and the second extension mechanism 121 are accurately in place.

The push-pull mechanism 19 is arranged on the turnover mechanism 10, which is used for pulling the battery pack from the electric vehicle onto the turnover mechanism 10, and can also be used for pushing the battery pack on the turnover mechanism 10 into the electric vehicle. The push-pull mechanism 19 is configured to move back and forth relative to the first turnover part 11, so as to realize the fixed connection with the used battery pack 4 or the fresh battery pack 4, thereby realizing the pulling or pushing operation.

Specifically, when the turnover mechanism 10 is located at the first position, the push-pull mechanism 19 is used for pulling out the used battery pack 4 from the electric vehicle 3; and when the turnover mechanism 10 is at the fourth position, the push-pull mechanism 19 is used for pushing the fresh battery pack 4 into the electric vehicle 3.

Figure 14:
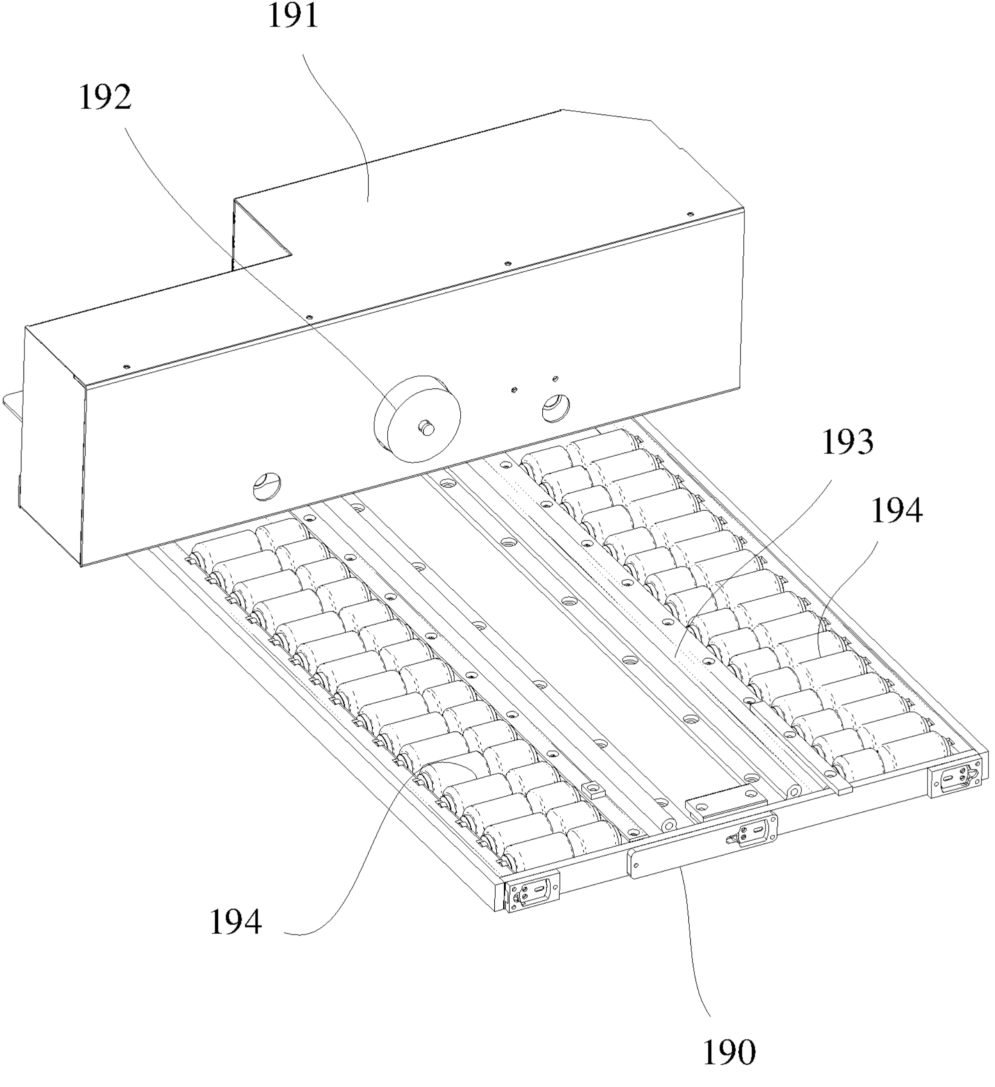
FIG. 14 is a structural diagram of the overall structure of the push-pull mechanism according to Embodiment 3 of the present invention.
Figure 15:
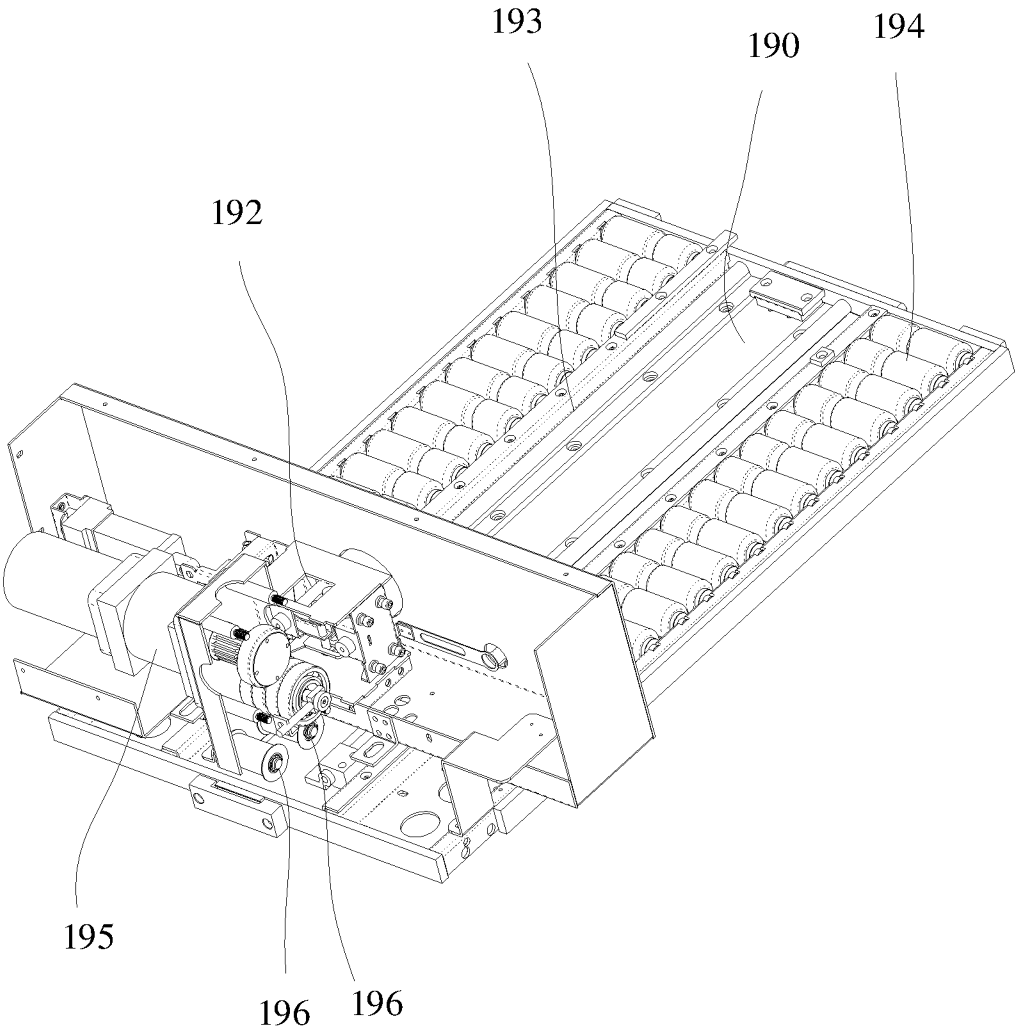
FIG. 15 is a structural diagram of the internal structure of the push-pull mechanism according to Embodiment 3 of the present invention.

As shown in FIG. 14 and FIG. 15, the push-pull mechanism 19 of this embodiment comprises a tray 190 and a tray-pushing box 191, wherein the tray 190 is connected with the first turnover part 11 and moves with the first turnover part 11, and the tray-pushing box 191 is arranged on the tray 190 and it is configured to move back and forth relative to the tray 190 so as to push or pull the battery pack 4, the reciprocating movement direction of the tray-pushing box 191 is same as the telescopic direction of the first extension mechanism 111. The tray-pushing box 191 is fixedly connected with the battery pack 4 then they move back and forth relative to the tray 190 together. The tray 190 moves following with the first turnover part 11, meanwhile, the tray-pushing box 191 further moves relative to the tray 190, thus, the tray-pushing box 191 can change its position relative to the first turnover part 11, so as to change the position of the battery pack on the first turnover part 11 and realize the push and pull of the battery pack 4. The position of the tray-pushing box 191 when it is retracted and stopped should not exceed the position of the plane where the second extension mechanism 121 is located, so as to ensure that the battery pack 4 can just abut the second extension mechanism 121 when the tray-pushing box 191 is retracted to the position, after such a turning over action, the battery pack 4 can stably fall on the second extension mechanism 121 to prevent the battery pack 4 from being turned over.

As shown in FIG. 4 and FIG. 14, the tray-pushing box 191 of this embodiment comprises a locking piece 192, the locking piece 192 is used for matching with the fixing piece arranged on the battery pack 4 to realize fixed connection so that realizing the fixed connection between the tray-pushing box 191 and the battery pack 4, thereby making the tray-pushing box 191 to pull or push the battery pack 4. The locking piece 192 ensures a firm connection between the battery pack 4 and the tray-pushing box 191 so as to move together with the tray-pushing box 191. Here, the locking piece 192 may be a conventional electromagnetic adsorption mechanism, correspondingly, the fixing piece on the battery pack 4 is a magnetic piece, and then the locking piece 192 is fixedly connected with the battery pack 4 by adsorbing the magnetic piece.

As shown in FIG. 14 and FIG. 15, the locking piece 192 of this embodiment is configured to adsorb and connect with the battery pack 4 when the turnover mechanism 10 is located at the first position and the fourth position, and is configured to release the adsorption force when the turnover mechanism 10 is turned to the second position or the third position. In other words, at the first position and the fourth position, the tray-pushing box is adsorbed and connected with the battery pack to 4 by the locking piece 192 to facilitate further pushing or pulling the battery pack 4; at the second position and the third position, the locking piece 192 releases the adsorption between it and the battery pack 4, so as to avoid interfering the second turnover part 12 to move the battery pack 4.

In order to ensure the firm connection for the battery pack 4 installed on the electric vehicle 3, and avoid occurring separation for the battery pack 4 due to shaking during the vehicle is on driving, usually a locking mechanism is equipped to firmly lock the battery pack 4 on the bottom of the electric vehicle 3. In this way, when the battery pack 4 needs to be replaced, the locking mechanism between the battery pack 4 and the electric vehicle 3 needs to be unlocked before the battery pack 4 is taken out. The tray-pushing box 191 of this embodiment comprises an unlocking mechanism (not shown in the figure), which is used for matching with a locking component on the battery pack 4, so as to unlock the battery pack 4 from the electric vehicle 3. At the same time of the tray-pushing box 191 contacting with the battery pack 4 to realize fixed connection, it can realize the unlock for the battery pack 4 by the unlocking mechanism, thereby improving the efficiency of picking and placing.

As shown in FIGS. 14 and 15, the push-pull mechanism 19 of this embodiment further comprises a tray-guiding rail 193 and a tray-driving device, wherein the tray-guiding rail 193 is arranged on the tray 190, and the tray-pushing box 191 is slidingly arranged on the tray-guiding rail 193, and the tray-driving device drives the tray-pushing box 191 to slide back and forth. The tray-guiding rail 193 plays a guiding role, which facilitates the tray-pushing box 191 stably moving according to a trajectory.

As shown in FIGS. 14 and 15, in this embodiment, a plurality of auxiliary rollers 194 are further arranged on the tray 190, the auxiliary rollers 194 are rollingly arranged in the moving direction of the tray-pushing box 191 and are in rolling contact with the bottom of the tray-pushing box 191. The auxiliary rollers 194 can reduce the resistance of the tray-pushing box 191 while provide support from underneath.

As shown in FIG. 15, the tray-driving device of this embodiment comprises a tray-driving motor 195 and a synchronous belt (not shown in the figure), one end of the synchronous belt is connected with the tray 190, the tray-driving motor 195 matches with the synchronous belt, and drives the tray-pushing box 191 to move relative to the tray 190 by the synchronous belt. Wherein, in this embodiment, the synchronous belt can be tensioned by the roller 196. And the moving distance and the moving position of the tray-pushing box 191 can be precisely controlled by the synchronous belt, thereby improving the position accuracy of the tray-pushing box.

In the present invention, during the battery pack 4 transfer process between the electric vehicle 3 and the battery charging bin, by using the way that the turnover mechanism 10 turn the battery pack 4 over in the longitudinal space, it requires less space and overcomes the technical problem that a large space is required for using a horizontal rotation way, and the turnover mechanism 10 is simpler in structure with respect to a horizontally rotating battery swapping device. Thus, the battery swapping device 1 of the present invention can complete picking and placing of larger battery packs between an electric vehicle and a charging station with a smaller space and easier, workable structure, meanwhile, it can also reduce the cost of the battery pack, which facilitate promoting. It can also optimize the occupied area of the battery swapping station. In addition, by the reciprocating movement of the push-pull mechanism 19, it can quickly take out the used battery pack 4 in the vehicle and put it onto the turnover mechanism 10 or push the fresh battery pack on the turnover mechanism 10 into the electric vehicle.

This embodiment also discloses a battery swapping method, the battery swapping method is implemented by using the above-mentioned battery swapping device 1, it comprises two processes: taking out a used battery pack 4 from the electric vehicle 3 and placing it in the battery charge bin so as to charge, and taking out a fresh battery pack 4 from the battery charge bin and installing it on the electric vehicle 3 so as to supply power for the electric vehicle 3.

1. The process of taking out a used battery pack 4 from the electric vehicle 3 and placing it in the battery charge bin is as follows:

Controlling the first extension mechanism 111 to extend toward the position installing the battery pack 4 of the electric vehicle 3 which is parked at a predetermined position, that is, extending toward the used battery pack 4, in this process, the first extension mechanism 111 drives the entire push-pull mechanism 19 to synchronously move toward the used battery pack 4.

After the first extension mechanism 111 extends in place, control the tray-pushing box 191 to further move forward along the tray 190, so as to make the tray-pushing box 191 to be closer to the used battery pack 4, at this moment, the locking piece 192 located at the front end of the tray-pushing box 191 is adsorbed and connected with the fixing piece on the used battery pack 4 to realize the fixed connection between the tray-pushing box 191 and the used battery pack 4.

After the tray-pushing box 191 is firmly connected with the used battery pack 4, control the tray-pushing box 191 to move backward along the tray 190, that is, reversely retract, when the tray-pushing box 191 is retracted, it will drive the fixedly connected battery pack 4 to synchronously move backward until the battery pack 4 is pulled onto the tray 190. At this moment, the position where the used battery pack 4 located is the first position of the turnover mechanism 10, and the first extension mechanism 111 carries the used battery pack 4.

After the tray-pushing box 191 retracts in place, control the first extension mechanism 111 to further retract. After the first extension mechanism 111 retracts in place, control the turnover mechanism 10 to turn 90 degrees along the first direction, thereby turning the used battery pack 4 at the first position to the second position along the first direction, at this moment, the second extension mechanism carries the used battery pack 4. At the first position, the first extension mechanism 111 is at a horizontal state and the second extension mechanism 121 is at a vertical state, here, the first direction is the turning direction that turns the first extension mechanism 111 into the vertical state and turn the second extension mechanism 121 into the horizontal state. Moreover, at the second position, the side where the electrical connector of the used battery pack 4 is located is at a state of facing upward.

After being turned in place, control to release the adsorption force between the locking piece 192 and the used battery pack 4, so that the tray-pushing box 191 and the used battery pack are at a separation state. Meanwhile, control the battery swapping device 1 to move the used battery pack 4 to the position corresponding to the battery charge bin. Here, the control of releasing adsorption force and the control of the battery swapping device moving are regardless of before and after.

Finally, control the second extension mechanism 121 to extend, so as to put the used battery pack 4 onto the carrying shelf in the battery charge bin, so that the electrical connector arranged on the top side in the battery charging bin goes down and is electrically connected with the electrical connector of the used battery pack 4, thereby charging the used battery pack 4.

2. The process of taking out the fresh battery pack 4 from the battery charge bin and installing it on the electric vehicle 3 is as follows:

Control the second extension mechanism 121 to extend toward the fresh battery pack 4 in the battery charge bin, so as to transport the fresh battery pack 4 out of the carrying shelf in the battery charge bin. The second extension mechanism 121 transports the fresh pack 4 to the third position.

Then, control the turnover mechanism 10 to turn 90 degrees along the second direction, so as to turn the fresh battery pack from the third position to the fourth position. Control the battery swapping device 1 to move the fresh battery pack 4 to a position corresponding to the electric vehicle 3. Wherein, the control of the battery swapping device 1 moving and the control of the turnover mechanism 10 turning are regardless of before and after. At the third position, the first extension mechanism 111 is at a vertical state and the second extension mechanism 121 is at a horizontal state. Here, the second direction is the turning direction that turns the first extension mechanism 111 into a horizontal state and turns the second extension mechanism 121 into a vertical state. Moreover, at the third position, the side where the electrical connector of a fresh battery pack 4 is located is at a state of facing up.

Then, control the locking piece 192 to be adsorbed with the fresh battery pack 4, so that the tray-pushing box 191 and the fresh battery pack 4 are at a fixing state. Wherein, it can also not implement adsorption connection between the locking member 192 and the fresh battery pack 4.

The first extension mechanism 111 is matched with the electric vehicle 3 and extended, and controls the tray-pushing box 191 to move forward along the tray 190, when the tray-pushing box 191 move forward, it will drive the fixedly connected battery pack 4 to synchronously move forward until the battery pack 4 is pushed into the electric vehicle 3.

Embodiment 4

As shown in FIG. 10 and FIG. 11, the difference between this embodiment and Embodiment 3 is that, the turnover driving device in this embodiment is driven by a telescopic rod 157. Therefore, the turnover motor is not comprised in this embodiment. Wherein, as shown in FIG. 10 and FIG. 11, the telescopic rod 157 of this embodiment is connected with the first turnover part 11 and/or the second turnover part 12 and drives the first turnover part 11 and the second turnover part 12 to rotate. The telescopic rod 157 generates the movement of the first turnover part 11 and the second turnover part 12 by expanding and contracting in its own length direction. The telescopic rod 157 can be a pneumatic or hydraulic mechanism.

The rotational plate 13 is connected with the rotating shaft, so the rotational plate 13 is restricted to rotate around the axis of the winding shaft. The telescopic rod 157 can be extended and retracted so as to change the distance between the two ends, that is, the distance between the rotational plate 13 and the base 14. The telescopic force generated by the telescopic rod 157 generates a torque relative to the rotating shaft, thereby driving the rotational plate 13 to rotate. Since the motion trajectories of the rotational plate 13 at all positions are arcs, the joint of the connection between the telescopic rod 157 and the rotational plate 13 moves in a circular arc trace together with the rotational plate 13, so the two ends of the telescopic rod 157 are respectively rotatable connection to facilitate the telescopic rod 157 adjusting the inclined posture to follow the rotation of the rotational plate 13.

A plurality of telescopic rods 157 can be configured, which are respectively connected with the first turnover part 11 and the second turnover part 12. It can also be set to connect both the first turnover part 11 and the second turnover part 12 simultaneously. Wherein, in this embodiment, since the bottoms of the first turnover part 11 and the second turnover part 12 are both connected with the base 14, just by the telescopic rod 157 being connected with the base 14, it can realize simultaneous connection.

As shown in FIG. 10 and FIG. 11, the turnover mechanism 10 of this embodiment comprises a base 14, the first turnover part 11 and the second turnover part 12 are rotatably arranged relative to the base 14, wherein, one end of the telescopic rod 157 is rotatably connected with the shared bottom (that is the bottom of rotational plate 13) of the first turnover part 11 and the second turnover part 12, and the other end of the telescopic rod 157 is rotatably connected with the base 14. The movement of the telescopic rod 157 along itself length direction, as well as the rotation of the both ends can realize the synthesis of the motion, which can avoid jam during the action, to smoothly realize the turnover of the first turnover part and 11 and the second turnover part 12.

Other parts in this embodiment use the mechanism same as that in Embodiment 3, or other alternative solutions that can be used in Embodiment 3, so here does not describe one by one in details.

In the process of transferring the battery pack between the electric vehicle and the charging bin, the present invention uses a turnover mechanism to turn the battery pack in the longitudinal space, which requires less space for the turnover, overcomes the technical problem of occupying a large space if use a horizontal rotation way, moreover, the turnover mechanism is simpler in structure with respect to the battery swapping device by horizontally rotating. Thus, the battery swapping device of the present invention can complete picking and placing of larger battery packs between electric vehicle and battery charging bin with a smaller space and easy, workable structure, meanwhile, it can reduce the cost of the battery pack and facilitating promotion. It can also optimize the occupied area of the battery swapping station. In addition, by the reciprocating movement of the push-pull mechanism, it can quickly take out the used battery pack in the vehicle and put it onto the turnover mechanism or push the fresh battery pack on the turnover mechanism into the electric vehicle.

Although the specific embodiments of the present invention are described above, those skilled in the art should understand that these are only examples, and various changes or modifications can be made to these embodiments without departing from the principle and essence of the present invention. Therefore, the protection scope of the present invention is defined by the appended claims.

What is claimed is:

1. A battery swapping device for transferring battery packs between an electric vehicle and a battery charging bin, wherein, the battery swapping device comprises a turnover mechanism, and the turnover mechanism is used for turning a used battery pack taken out of an electric vehicle vertically by 90 degrees from a first position to a second position in a first direction; or the battery swapping device is used for turning a fresh battery pack taken out of a battery charging bin vertically by 90 degrees from a third position to a fourth position in a second direction, the first direction being opposite to the second direction.

2. The battery swapping device as claimed in claim 1, wherein, the battery swapping device comprises a push-pull mechanism, the push-pull mechanism is connected with the turnover mechanism, and the push-pull mechanism is arranged to move back and forth relative to the turnover mechanism, when the turnover mechanism is located at the first position, the push-pull mechanism is used for pulling the used battery pack out of an electric vehicle; when the turnover mechanism is located at the fourth position, the push-pull mechanism is used for pushing the fresh battery pack into electric vehicle.

3. The battery swapping device as claimed in claim 2, wherein, the turnover mechanism comprises a first turnover part and a second turnover part, the push-pull mechanism is connected with the first turnover part, and the push-pull mechanism is arranged to move back and forth relative to the first turnover part.

4. The battery swapping device as claimed in claim 3, wherein, the push-pull mechanism comprises a tray and a tray-pushing box, wherein, the tray is connected with the first turnover part and rotates with the first turnover part, and the tray-pushing box is arranged on the tray and is configured to move back and forth relative to the tray so as to push or pull battery pack;

or, the push-pull mechanism comprises a tray and a tray-pushing box, wherein, the tray is connected with the first turnover part and rotates with the first turnover part, and the tray-pushing box is arranged on the tray and is configured to move back and forth relative to the tray so as to push or pull battery pack, the tray-pushing box comprises an unlocking mechanism for matching with an unlocking component on the battery pack, so as to unlock the battery pack from the electric vehicle.

5. The battery swapping device as claimed in claim 3, wherein, the push-pull mechanism comprises a tray and a tray-pushing box, wherein, the tray is connected with the first turnover part and rotates with the first turnover part, and the tray-pushing box is arranged on the tray and is configured to move back and forth relative to the tray so as to push or pull battery pack, the tray-pushing box also comprises a locking piece, the locking piece is used to match with the fixing piece arranged on the battery pack so that the tray-pushing box is connected with the battery pack to pull or push the battery pack;

or, the push-pull mechanism comprises a tray and a tray-pushing box, wherein, the tray is connected with the first turnover part and rotates with the first turnover part, and the tray-pushing box is arranged on the tray and is configured to move back and forth relative to the tray so as to push or pull battery pack, the tray-pushing box also comprises a locking piece, the locking piece is used to match with the fixing piece arranged on the battery pack so that the tray-pushing box is connected with the battery pack to pull or push the battery pack; the fixing piece is a magnetic piece, and the locking piece is configured to be able to adsorb with the magnetic piece so as to connect with battery pack;

the locking piece is configured to adsorb and connect with the battery pack when the turnover mechanism is located at first position or fourth position, and is configured as releasing adsorption connection when the turnover mechanism is located at second position or third position.

6. The battery swapping device as claimed in claim 5, wherein, the push-pull mechanism further comprises a tray-guiding rail and a tray-driving device, wherein, the tray-guiding rail is arranged on the tray, and the tray-pushing box is slidingly arranged on the tray-guiding rail, and the tray-driving device drives the tray-pushing box to slide back and forth;

or, the push-pull mechanism further comprises a tray-guiding rail and a tray-driving device, wherein, the tray-guiding rail is arranged on the tray, and the tray-pushing box is slidingly arranged on the tray-guiding rail, and the tray-driving device drives the tray-pushing box to slide back and forth, the tray-driving device comprises a tray-driving motor and a synchronous belt, one end of the synchronous belt is connected with the tray, the tray-driving motor matches with the synchronous belt, and drives the tray-pushing box to move relative to the tray by means of the synchronous belt;

the tray is also provided with a plurality of auxiliary rollers, and the auxiliary roller is arranged in a rolling way at the moving direction of the tray-pushing box, and contact in a rolling way with the bottom of the tray-pushing box.

7. The battery swapping device as claimed in claim 4, wherein, the first turnover part comprises a first extension mechanism, and the second turnover part comprises a second extension mechanism, and the push-pull mechanism is connected with the first extension mechanism, wherein, the first extension mechanism picks and places the battery pack at first position or fourth position, and the second extension mechanism picks and places the battery pack at second position or third position, reciprocating movement direction of the tray-pushing box is same as expansion and contraction direction of the first extension mechanism;

or, the first turnover part comprises a first extension mechanism, and the second turnover part comprises a second extension mechanism, and the push-pull mechanism is connected with the first extension mechanism, wherein, the first extension mechanism picks and places the battery pack at first position or fourth position, and the second extension mechanism picks and places the battery pack at second position or third position, reciprocating movement direction of the tray-pushing box is same as expansion and contraction direction of the first extension mechanism, the position of the tray-pushing box when it is retracted and stopped does not exceed the position of the plane where the second extension mechanism is located at.

8. The battery swapping device as claimed in claim 1, wherein, the turnover mechanism comprises a first turnover part and a second turnover part, the first turnover part is used for carrying battery pack located at first position or fourth position, and the second turnover part is used for carrying battery pack located at second position or third position, the first turnover part and the second turnover part turn coaxially;

the battery pack has a first side and a second side which are perpendicular to each other, when battery pack is located at first position or fourth position, first side is carried on first turnover part, and second side is abutted on second turnover part; when battery pack is located at second position or third position, second side is carried on second turnover part, and first side is abutted on first turnover part;

the first turnover part and the second turnover part are arranged to be perpendicular to each other;

or, the turnover mechanism comprises a first turnover part and a second turnover part, the first turnover part is used for carrying battery pack located at first position or fourth position, and the second turnover part is used for carrying battery pack located at second position or third position, the first turnover part and the second turnover part turn coaxially; the first turnover part and the second turnover part are driven by a same turnover driving device, or the first turnover part and the second turnover part are driven by different turnover driving devices.

9. The battery swapping device as claimed in claim 8, wherein the turnover driving device comprises a telescopic rod, and the telescopic rod is connected with the first turnover part and/or the second turnover part and drives the first turnover part and the second turnover part to rotate;

or, the turnover driving device comprises a telescopic rod, and the telescopic rod is connected with the first turnover part and/or the second turnover part and drives the first turnover part and the second turnover part to rotate, the turnover mechanism comprises a base, the first turnover part and the second turnover part are rotatably arranged relative to the base, wherein, one end of the telescopic rod is rotatably connected with the bottom of the first turnover part and/or the second turnover part, and the other end of the telescopic rod is rotatably connected with the base.

10. The battery swapping device as claimed in claim 8, wherein, the turnover driving device comprises a turnover motor and a gear set, the turnover motor drives gear set to rotate, and the gear set is connected with the first turnover part and/or the second turnover part and drives the first turnover part and/or the second turnover part to rotate;

or, the turnover driving device comprises a turnover motor and a gear set, wherein the gear set at least comprises an input gear and an output gear, input gear and output gear are gear connected with each other, wherein the turnover motor directly or indirectly drives the input gear to rotate, the first turnover part and the second turnover part are fixedly connected with the output gear by means of a turning shaft, and rotate with the output gear.

11. The battery swapping device as claimed in claim 8, wherein, the first turnover part and the second turnover part are both connected with a rotational plate, and the turnover driving device is connected with the rotational plate and drives the rotational plate to rotate.

12. The battery swapping device as claimed in claim 1, wherein, first turnover part and/or second turnover part are provided with an extension mechanism for taking out battery pack located at electric vehicle or battery charging bin, or placing the battery pack on electric vehicle or battery charging bin.

13. The battery swapping device as claimed in claim 12, wherein, the first turnover part comprises a first extension mechanism, and the second turnover part comprises a second extension mechanism, wherein, the first extension mechanism picks and places battery pack at first position or fourth position, and the second extension mechanism picks and places the battery pack at second position or third position;

extension direction of the first extension mechanism and extension direction of the second extension mechanism are intersected, so that the battery pack is relayed between the first extension mechanism and the second extension mechanism;

or, the first turnover part comprises a first extension mechanism, and the second turnover part comprises a second extension mechanism, wherein, the first extension mechanism picks and places battery pack at first position or fourth position, and the second extension mechanism picks and places the battery pack at second position or third position, both the first extension mechanism and the second extension mechanism are telescopic fork.

14. The battery swapping device as claimed in claim 13, wherein, the battery swapping device further comprises a limit sensor, the limit sensor is used for detecting extension distance of the first extension mechanism and the second extension mechanism, and adjusting extension distance of the first extension mechanism and the second extension mechanism respectively by the first transmission motor and the second transmission motor.

15. The battery swapping device as claimed in claim 10, wherein, the battery swapping device further comprises a turnover-in-position sensor, the turnover-in-position sensor is used for detecting turnover angle of the first turnover part and the second turnover part, and adjusting turnover angle of the first turnover part and the second turnover part by the turnover motor.

16. The battery swapping device as claimed in claim 8, wherein, the turnover mechanism comprises a base, the first turnover part and the second turnover part are rotatably connected with the base, and the turnover driving device drives the first turnover part and the second turnover part to rotate.

17. The battery swapping device as claimed in claim 16, wherein, the battery swapping device comprises an outer frame and a lifting mechanism, and the base is connected with the outer frame by means of the lifting mechanism, and moved up and down relative to the outer frame;

or, the battery swapping device comprises an outer frame and a lifting mechanism, and the base is connected with the outer frame by means of the lifting mechanism, and moved up and down relative to the outer frame, the lifting mechanism is connected with the outer frame by means of a chain transmission mechanism, and the lifting mechanism and the outer frame are guided between themselves by guide wheels.

18. A battery swapping station, wherein the battery swapping station comprises:

a vehicle-carrying platform for parking an electric vehicle to swap battery pack;

a charging equipment, the charging equipment is provided with a plurality of charging bins for placing battery packs, and an electrical connector is arranged in charging bin, which is used for electric connection with battery pack located in the charging bin to charge;

the battery swapping device as claimed in claim 1, used for picking, placing and transferring battery between electric vehicle and battery charging bins, and the turnover mechanism is used for vertically turning the battery pack taken out of battery charging bin or electric vehicle.

19. A battery swapping method, wherein, the battery swapping method is implemented by using the battery swapping device as claimed in claim 1, comprising:

taking out a used battery pack from an electric vehicle and place it at a first position;

turning taken-out used battery pack vertically by 90 degrees from first position to second position in first direction;

placing used battery pack in second position into battery charging bin for charging, and/or taking fresh battery pack out of battery charging bin and placing it at third position;

turning taken out fresh battery pack vertically by 90 degrees from third position to fourth position in second direction;

placing fresh battery pack at the fourth position into electric vehicle.

20. A battery swapping method, wherein, the battery swapping method is implemented by the battery swapping device as claimed in claim 2, comprising:

pulling out a used battery pack in an electric vehicle to first position by means of push-pull mechanism;

turning taken-out used battery pack vertically 90 degrees from first position to second position in first direction;

placing used battery pack at corresponding position in battery charging bin and putting used battery pack into battery charging bin for charging;

and/or, taking out a fresh battery pack from battery charging bin and placing it at third position;

turning taken-out fresh battery pack vertically by 90 degrees from third position to fourth position in second direction;

placing fresh battery pack at corresponding position in electric vehicle and pushing fresh battery pack into electric vehicle by means of push-pull mechanism.

* * * * *